(12) United States Patent
Ohno et al.

(10) Patent No.: US 12,044,344 B2
(45) Date of Patent: Jul. 23, 2024

(54) PLATE-TYPE REFRIGERANT PIPE AND REFRIGERATION APPARATUS

(71) Applicant: DAIKIN INDUSTRIES, LTD., Osaka (JP)

(72) Inventors: Asahi Ohno, Osaka (JP); Fumiaki Koike, Osaka (JP); Masanori Jindou, Osaka (JP); Ayumi Komaki, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 81 days.

(21) Appl. No.: 17/726,871

(22) Filed: Apr. 22, 2022

(65) Prior Publication Data
US 2022/0243852 A1  Aug. 4, 2022

Related U.S. Application Data

(63) Continuation of application No. PCT/JP2020/034720, filed on Sep. 14, 2020.

(30) Foreign Application Priority Data

Nov. 1, 2019  (JP) .................. 2019-199539

(51) Int. Cl.
*F16L 41/02* (2006.01)
*F25B 41/40* (2021.01)

(52) U.S. Cl.
CPC .............. *F16L 41/02* (2013.01); *F25B 41/40* (2021.01)

(58) Field of Classification Search
CPC .......... F16L 41/02; F16L 41/001; F25B 41/40
See application file for complete search history.

(56) References Cited

U.S. PATENT DOCUMENTS 5,354,101 A * 10/1994 Anderson, Jr. ........ F16L 41/086
6,443,502 B1 *  9/2002 Iida .......................... F25B 41/40
(Continued)

FOREIGN PATENT DOCUMENTS

JP  S50-142570 U  11/1975
JP  H07-198229 A   8/1995
(Continued)

OTHER PUBLICATIONS

Extended European Search Report issued in corresponding European Patent Application No. 20882348.4 dated Nov. 15, 2022 (8 pages).

(Continued)

*Primary Examiner* — Zachary T Dragicevich
(74) *Attorney, Agent, or Firm* — Osha Bergman Watanabe & Burton LLP

(57) ABSTRACT

A plate-type refrigerant pipe includes: a first plate; and a second plate. The first plate and the second plate are joined to form a refrigerant flow path. The first plate includes a first connection portion to which a first refrigerant pipe is connected and that causes the refrigerant flow path to communicate with the first refrigerant pipe. The second plate includes a second connection portion to which a second refrigerant pipe is connected and that causes the refrigerant flow path to communicate with the second refrigerant pipe. One or both of the first plate and the second plate include a third connection portion to which a third refrigerant pipe is connected and that causes the refrigerant flow path to communicate with the third refrigerant pipe.

11 Claims, 14 Drawing Sheets

(56) References Cited

U.S. PATENT DOCUMENTS

2015/0233514 A1* 8/2015 Kesler .................. F16L 41/086
2015/0292780 A1* 10/2015 Kitamura ................ F25B 41/40

FOREIGN PATENT DOCUMENTS

| JP | H08-226729 A | 9/1996 |
|----|--------------|--------|
| JP | H09-14685 A | 1/1997 |
| JP | H09-79616 A | 3/1997 |
| JP | H09-280778 A | 10/1997 |
| JP | 2006132802 A | 5/2006 |
| JP | 2010-156501 A | 7/2010 |
| JP | 2014-142137 A | 8/2014 |

OTHER PUBLICATIONS

International Search Report issued in corresponding International Application No. PCT/JP2020/034720 mailed Nov. 17, 2020 (2 pages).
English translation of the International Preliminary Report on Patentability issued in corresponding International Application No. PCT/JP2020/034720, mailed May 3, 2022 (6 pages).

* cited by examiner

US 12,044,344 B2

PLATE-TYPE REFRIGERANT PIPE AND REFRIGERATION APPARATUS

TECHNICAL FIELD

The present disclosure relates to a plate-type refrigerant pipe and a refrigeration apparatus.

BACKGROUND

A refrigeration apparatus including a refrigerant circuit in which a vapor compression refrigeration cycle is executed is known to integrate refrigerant pipes through which a refrigerant flows into one unit to reduce the size of the refrigerant circuit. For example, Patent Literature 1 discloses a plate-type refrigerant pipe unitized by joining two plates and forming a plurality of refrigerant flow paths between the two plates.

Three or more other refrigerant pipes are connected to the plate-type refrigerant pipe described in Patent Literature 1, and these other refrigerant pipes communicate with each other by the refrigerant flow path of the plate-type refrigerant pipe. Specifically, each of the plurality of other refrigerant pipes is connected to a separate refrigerant flow path. By causing these refrigerant flow paths to cross each other, the plurality of other refrigerant pipes communicates with each other.

PATENT LITERATURE

PATENT LITERATURE 1: Japanese Laid-Open Patent Publication No. H7-198229

SUMMARY (1) A plate-type refrigerant pipe according to the present disclosure includes:

a first plate; and a second plate joined to the first plate and forming a refrigerant flow path together with the first plate, in which the first plate includes a first connection portion to which a first refrigerant pipe is connected to cause the refrigerant flow path and the first refrigerant pipe to communicate with each other, the second plate includes a second connection portion to which a second refrigerant pipe is connected to cause the refrigerant flow path and the second refrigerant pipe to communicate with each other, the first plate and/or the second plate includes a third connection portion to which a third refrigerant pipe is connected to cause the refrigerant flow path and the third refrigerant pipe to communicate with each other, and the first connection portion and the second connection portion overlap each other in a first direction perpendicular to a joining surface of the first plate and the second plate.

(2) A refrigeration apparatus of the present disclosure includes the plate-type refrigerant pipe according to (1) described above.

DETAILED DESCRIPTION

Hereinafter, one or more embodiments of the present disclosure will be described in detail with reference to the accompanying drawings.

[Overall Configuration of Refrigeration Apparatus]

Figure 1:
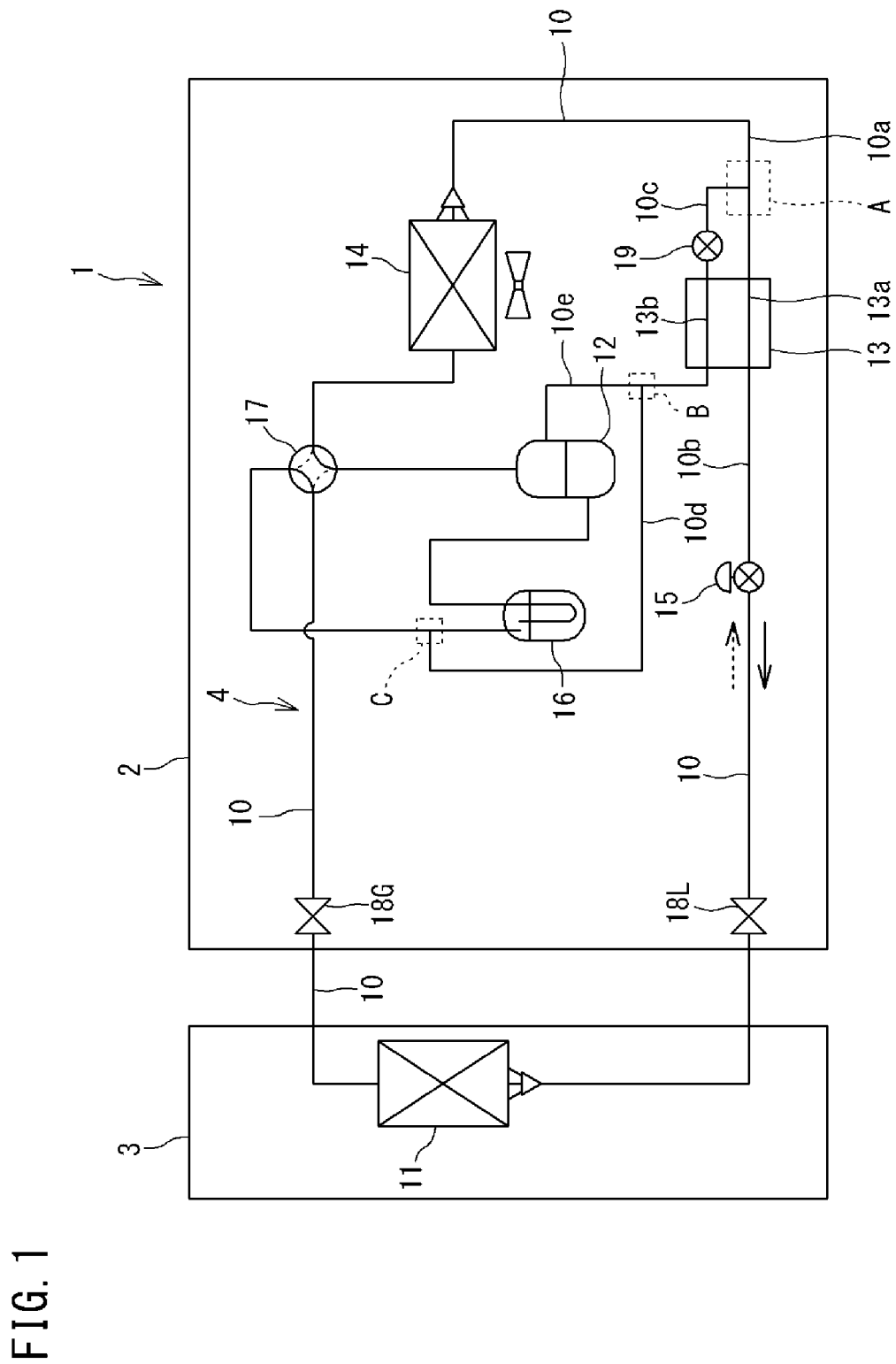
FIG. 1 is a schematic configuration diagram of a refrigeration apparatus according to one or more embodiments of the present disclosure.

FIG. 1 is a schematic configuration diagram of a refrigeration apparatus according to one or more embodiments of the present disclosure.

A refrigeration apparatus 1 is, for example, an air conditioner that adjusts indoor temperature and humidity, and includes an outdoor unit 2 installed outdoors and an indoor unit 3 installed indoors. The outdoor unit 2 and the indoor unit 3 are connected to each other by a refrigerant pipe 10.

The refrigeration apparatus 1 includes a refrigerant circuit 4 that executes a vapor compression refrigeration cycle. The refrigerant circuit 4 includes a plurality of element components and the refrigerant pipe 10 connecting the plurality of element components. The refrigerant circuit 4 includes an indoor heat exchanger 11, a compressor 12, a subcooler 13, an outdoor heat exchanger 14, an expansion mechanism 15, an accumulator 16, a four-way switching valve 17, shutoff valves 18L and 18G, and the like, which are connected by the refrigerant pipe 10.

The indoor heat exchanger 11 is provided in the indoor unit 3 and exchanges heat between a refrigerant and indoor air. As the indoor heat exchanger 11, for example, a cross-fin fin-and-tube heat exchanger, a microchannel heat exchanger, or the like can be adopted. An indoor fan (not shown) for blowing the indoor air to the indoor heat exchanger 11 and sending conditioned air to the room is provided near the indoor heat exchanger 11.

The compressor 12, the subcooler 13, the outdoor heat exchanger 14, the expansion mechanism 15, the accumulator 16, the four-way switching valve 17, and the shutoff valves 18L and 18G are provided in the outdoor unit 2. The compressor 12 compresses the refrigerant sucked from a suction pipe and discharges the refrigerant from a discharge pipe. As the compressor 12, for example, various compressors such as a scroll compressor can be adopted.

The outdoor heat exchanger 14 exchanges heat between the refrigerant and outdoor air. As the outdoor heat exchanger 14, for example, a cross-fin fin-and-tube heat exchanger, a microchannel heat exchanger, or the like can be adopted. An outdoor fan for blowing the outdoor air to the outdoor heat exchanger 14 is provided near the outdoor heat exchanger 14.

The expansion mechanism 15 is disposed between the outdoor heat exchanger 14 and the indoor heat exchanger 11 in the refrigerant pipe 10 of the refrigerant circuit 4, and expands the inflowing refrigerant to decompress the refrigerant to predetermined pressure. As the expansion mechanism 15, for example, an electronic expansion valve with a variable opening degree or a capillary tube can be adopted.

The accumulator 16 is disposed between a suction port of the compressor 12 and the four-way switching valve 17 in the refrigerant circuit 4, and separates the inflowing refrigerant into gas and liquid. The gas refrigerant separated in the accumulator 16 is sucked into the compressor 12.

The four-way switching valve 17 can be switched between a first state indicated by the solid line and a second state indicated by the broken line in FIG. 1. When the air conditioner 1 executes a cooling operation, the four-way switching valve 17 is switched to the first state, and when the air conditioner 1 executes a heating operation, the four-way switching valve 17 is switched to the second state.

The subcooler 13 subcools the refrigerant condensed by the outdoor heat exchanger 14. The subcooler 13 includes a first flow path 13a and a second flow path 13b. A refrigerant pipe 10a from the outdoor heat exchanger 14 is connected to one end of the first flow path 13a. A refrigerant pipe 10b leading to the expansion mechanism 15 is connected to the other end of the first flow path 13a. A refrigerant pipe 10c branching off from the refrigerant pipe 10a is connected to one end of the second flow path 13b. An expansion valve 19 is provided in the refrigerant pipe 10c. A refrigerant pipe 10d leading to the accumulator 16 is connected to the other end of the second flow path 13b. A refrigerant pipe 10e further branches off from the refrigerant pipe 10d, and the refrigerant pipe 10e is connected to an intermediate injection port of the compressor 12. The subcooler 13 exchanges heat between a high-pressure liquid refrigerant flowing from the outdoor heat exchanger 14 to the first flow path 13a, and a low-pressure gas-liquid two-phase refrigerant that is decompressed in the expansion valve 19 and flows through the second flow path 13b.

When the air conditioner 1 executes the cooling operation, the outdoor heat exchanger 14 functions as a refrigerant radiator (condenser), and the indoor heat exchanger 11 functions as a refrigerant evaporator. The refrigerant discharged from the compressor 12 is condensed in the outdoor heat exchanger 14 and further cooled in the subcooler 13. Thereafter, the refrigerant is decompressed in the expansion mechanism 15, then evaporates in the indoor heat exchanger 11, and is sucked into the compressor 12 through the accumulator 16. The refrigerant that has passed through the second flow path 13b of the subcooler 13 from the refrigerant pipe 10c branches into a channel in which the refrigerant flows from the refrigerant pipe 10d into the accumulator 16 and then is sucked into the compressor 12, and a channel in which the refrigerant is sucked from the refrigerant pipe 10e into the intermediate injection port of the compressor 12.

When the air conditioner 1 executes the heating operation, the outdoor heat exchanger 14 functions as a refrigerant evaporator and the indoor heat exchanger 11 functions as a refrigerant radiator (condenser). The refrigerant discharged from the compressor 12 is condensed in the indoor heat exchanger 11, and then is decompressed in the expansion mechanism 15, evaporates in the outdoor heat exchanger 14, and is sucked into the compressor 12.

[Configuration of Refrigerant Pipe]

Figure 2:
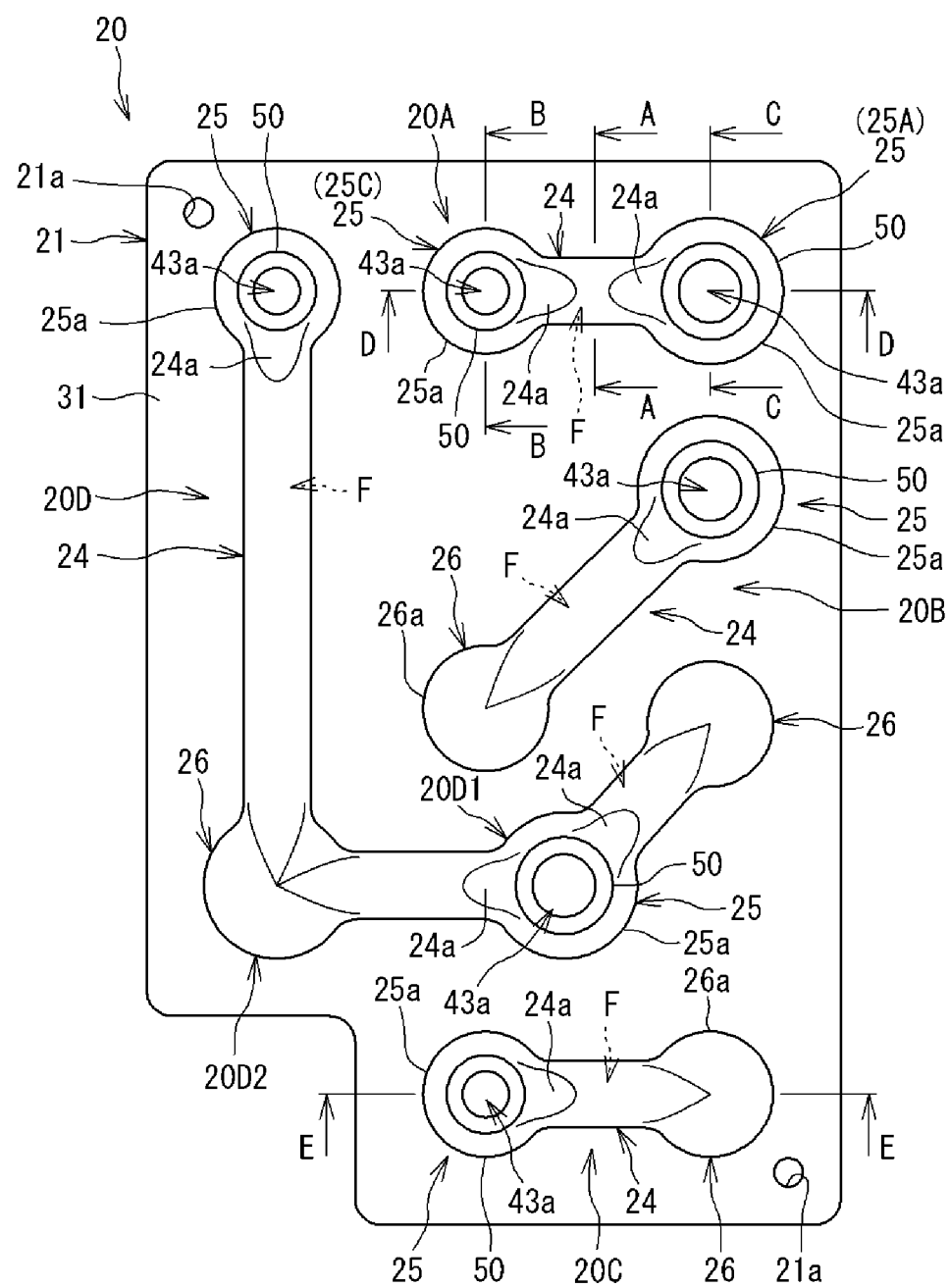
FIG. 2 is a front view of a plate-type refrigerant pipe according to one or more embodiments.
Figure 3:
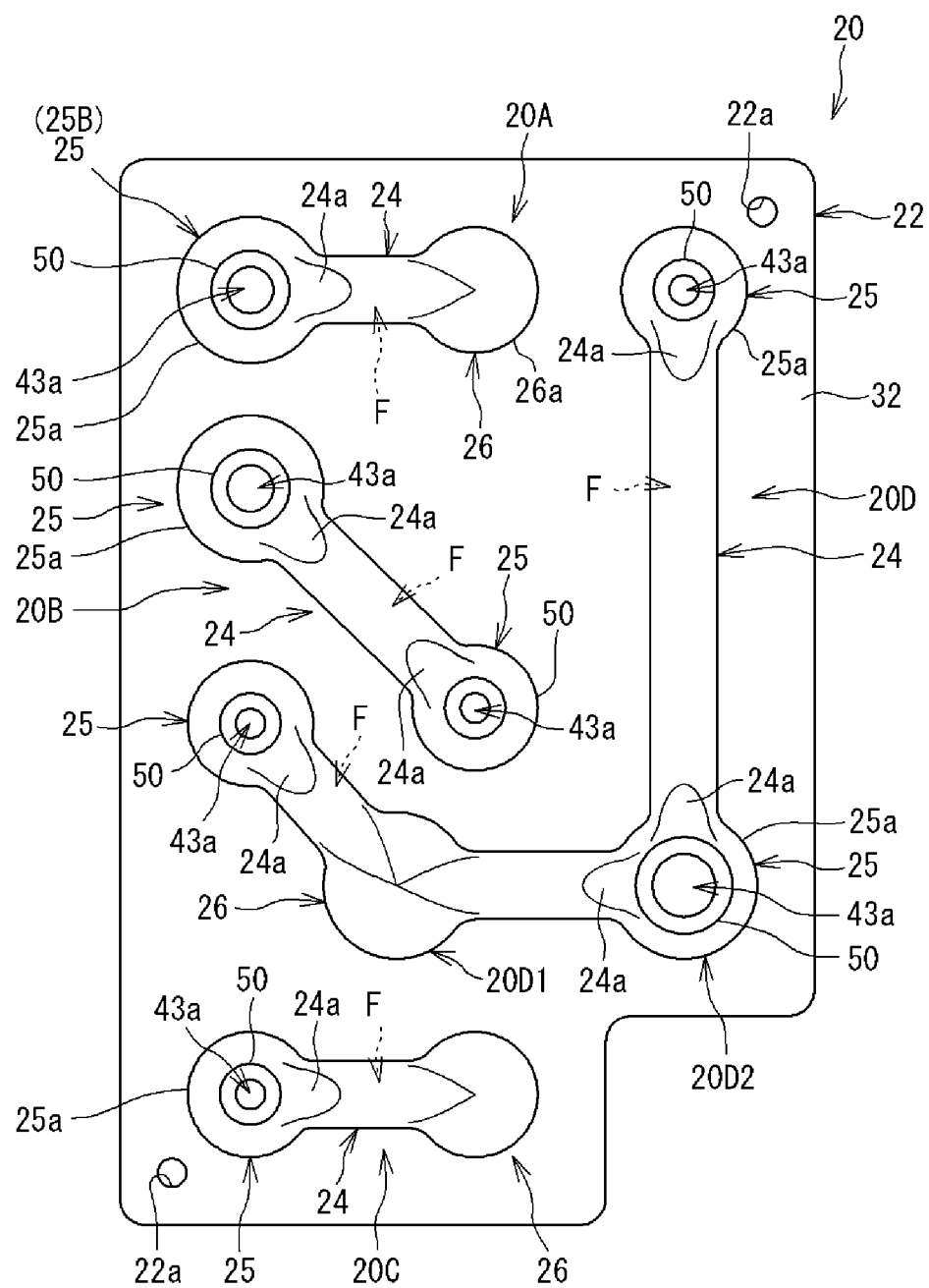
FIG. 3 is a rear view of the plate-type refrigerant pipe according to one or more embodiments.
Figure 4:
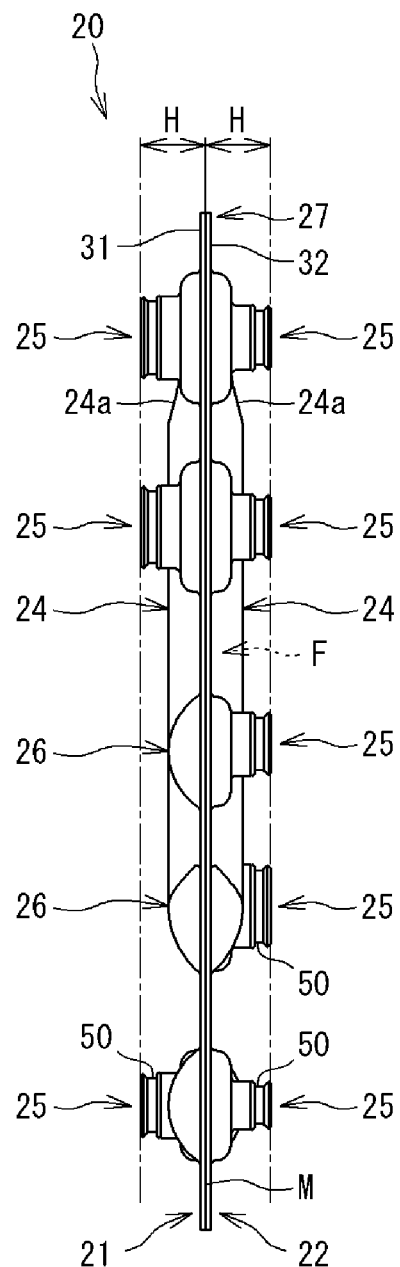
FIG. 4 is a side view of the plate-type refrigerant pipe according to one or more embodiments.

FIG. 2 is a front view showing the plate-type refrigerant pipe according to one or more embodiments. FIG. 3 is a rear view of the plate-type refrigerant pipe according to one or more embodiments. FIG. 4 is a side view of the plate-type refrigerant pipe according to one or more embodiments.

Part of the refrigerant pipe 10 of one or more embodiments includes a plate-type refrigerant pipe 20 as shown in FIG. 2 to FIG. 4. For example, the plate-type refrigerant pipe 20 is used at a portion where the refrigerant joins or branches, such as A, B, and C portions of the refrigerant circuit 4 in FIG. 1. The plate-type refrigerant pipe 20 is a plurality of pipe portions 20A to 20D through which the refrigerant flows, unitized by laminating two plates, a first plate 21 and a second plate 22.

Generally, most of refrigerant pipes used in air conditioners are made of copper, but the refrigerant pipes made of copper are expensive and fluctuate greatly in price. The first plate 21 and the second plate 22 used in the plate-type refrigerant pipe 20 of one or more embodiments are made of stainless steel. This allows lower-cost manufacturing than the refrigerant pipes made of copper. The first plate 21 and the second plate 22 are formed of, for example, SUS304, SUS304L, SUS436L, SUS430 or the like. Stainless steel is steel containing 1.2% or less of carbon and 10.5% or more of chromium.

The plate-type refrigerant pipe 20 of one or more embodiments includes the plurality of pipe portions 20A to 20D. Each of the pipe portions 20A to 20D is formed long in a refrigerant flow direction. Each of the pipe portions 20A to 20D includes a pipe body 24, a connection portion 25, and a closed portion 26. A refrigerant flow path F is formed inside the pipe body 24, the connection portion 25, and the closed portion 26. The pipe body 24, the connection portion 25, and the closed portion 26 are formed by pressing and recessing part of the first and second plates 21 and 22. In the following description, the cross section in a direction orthogonal to the longitudinal direction of the pipe portions 20A to 20D and the refrigerant flow path F is referred to as a "cross section".

The pipe body 24 is formed in a cylindrical shape. The pipe body 24 is formed long in the refrigerant flow direction and constitutes a main part of the refrigerant flow path F. The connection portion 25 is provided at an end of the pipe body 24. The connection portion 25 is a portion for connecting another refrigerant pipe to the pipe portions 20A to 20D. The closed portion 26 is also provided at an end of the pipe body 24. The closed portion 26 stops the flow of refrigerant in a predetermined direction (first direction described later) at the end of the pipe body 24.

The plate-type refrigerant pipe 20 includes a joining portion 27 in addition to the pipe body 24, the connection portion 25, and the closed portion 26. The joining portion 27 is a portion where the first plate 21 and the second plate 22 are directly joined, and is formed in a flat plate shape.

As shown in FIG. 2 to FIG. 4, the first plate 21 includes a first flat plate portion 31 formed in a flat shape. The second plate 22 includes a second flat plate portion 32 formed in a flat shape. An outer peripheral edge shape of the first flat plate portion 31 and an outer peripheral edge shape of the second flat plate portion 32 are identical to each other. The first flat plate portion 31 and the second flat plate portion 32 are joined to each other by brazing in a superimposed state.

As shown in FIG. 2, a plurality of first alignment portions 21a is formed in the first flat plate portion 31. As shown in FIG. 3, a plurality of second alignment portions 22a is formed in the second flat plate portion 32. The first alignment portion 21a and the second alignment portion 22a are holes having identical diameter. The first alignment portion 21a and the second alignment portion 22a are aligned with each other and communicate with each other when the first flat plate portion 31 and the second flat plate portion 32 are superimposed.

Therefore, when joining the first flat plate portion 31 and the second flat plate portion 32 by brazing, the first flat plate portion 31 and the second flat plate portion 32 can be aligned with each other by inserting a jig such as a rod into the first alignment portion 21a and the second alignment portion 22a. Note that the first alignment portion 21a and the second alignment portion 22a are not limited to holes, and may include a protrusion formed on one side and a concave portion or a hole formed on the other side and into which the protrusion is fitted.

As shown in FIG. 4, the first flat plate portion 31 and the second flat plate portion 32 are joined together to form the above-described joining portion 27. In the following description, the surface where the first flat plate portion 31 and the second flat plate portion 32 are in contact with each other and are joined is also referred to as "joining surface M". The direction perpendicular to the joining surface M is also referred to as "first direction". The direction along the joining surface M and orthogonal to the longitudinal direction of the pipe portions 20A to 20D is also referred to as "second direction".

The plate-type refrigerant pipe 20 of one or more embodiments is provided with the pipe portions 20A to 20D having the following three patterns.

(1) The pipe portions 20A and 20B of the first pattern in which the connection portions 25 are provided at both ends of the pipe body 24 on one of the first plate 21 side and the second plate 22 side of the plate-type refrigerant pipe 20, and the connection portion 25 is provided at one end of the pipe body 24 and the closed portion 26 is provided at the other end on the other of the first plate 21 side and the second plate 22 side.

(2) The pipe portion 20C of the second pattern in which the closed portion 26 is provided at one end of the pipe body 24 and the connection portion 25 is provided at the other end on the first plate 21 side of the plate-type refrigerant pipe 20, the connection portion 25 is provided at one end of the pipe body 24 and the closed portion 26 is provided at the other end on the second plate 22 side of the plate-type refrigerant pipe 20, and the connection portion 25 and the closed portion 26 are disposed opposite each other in the first direction.

(3) The pipe portion 20D of the third pattern in which the connection portion 25 and/or the closed portion 26 is provided in the middle of the longitudinal direction of the pipe body 24 of (1) or (2) described above.

Hereinafter, the pipe portions 20A to 20D in each pattern will be described.

[Pipe Portion of First Pattern]

Figure 5:
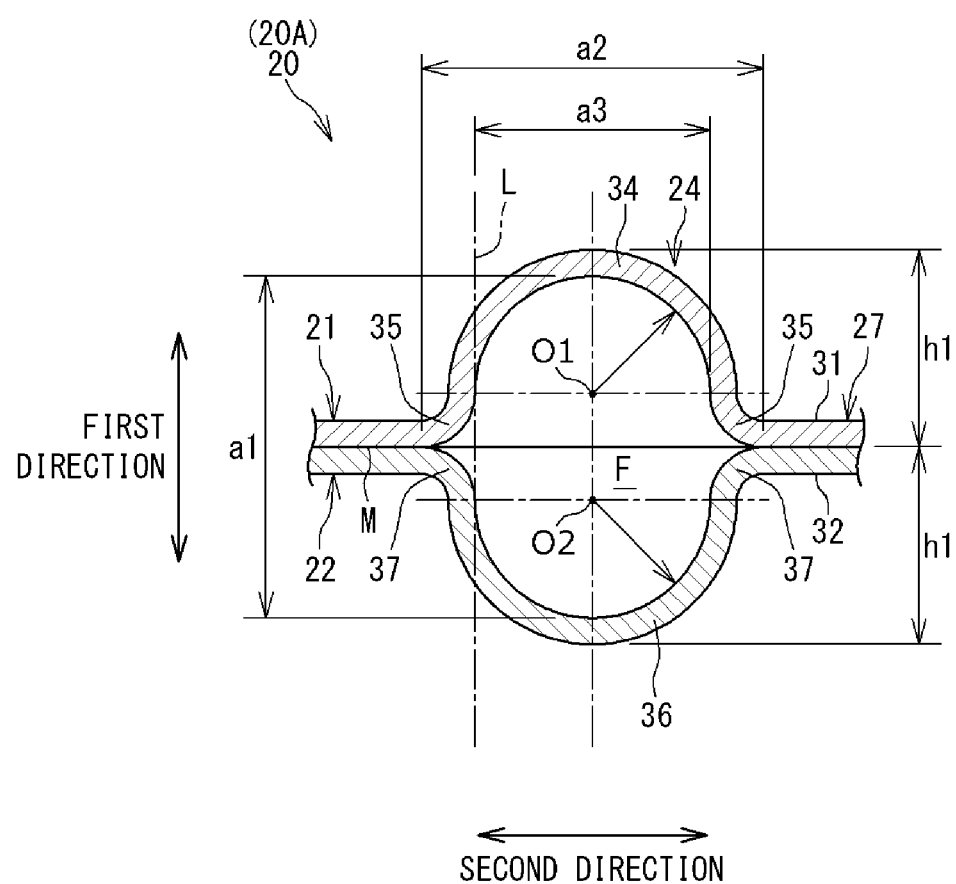
FIG. 5 is a cross-sectional view taken along the line A-A in FIG. 2.

FIG. 5 is a cross-sectional view taken along the line A-A in FIG. 2. FIG. 5 shows, in particular, the pipe portion 20A of the first pattern.

(Configuration of Pipe Body 24)

The pipe body 24 includes a first recessed groove 34 and a first curved portion 35 formed in the first plate 21. The first recessed groove 34 is formed in an arc shape in the cross section of the pipe body 24 (refrigerant flow path F). More specifically, the first recessed groove 34 is formed in a semicircular shape. The center O1 of the semicircle of the first recessed groove 34 is located on the first plate 21 side of the joining surface M in the first direction (upper side in FIG. 5). In other words, the center O1 of the semicircle of the first recessed groove 34 is located on the side where the first recessed groove 34 is recessed from the joining surface M in the first direction.

The first curved portion 35 is disposed between the first recessed groove 34 and the first flat plate portion 31. The first curved portion 35 is curved to rise in the first direction from the first flat plate portion 31 (joining surface M) toward the end of the first recessed groove 34. The first curved portion 35 of one or more embodiments is formed in an arc shape that curves at about 90°. The end on the first recessed groove 34 side of the first curved portion 35 and the end of the first recessed groove 34 are smoothly connected to each other. Therefore, the tangent line of the first curved portion 35 and the tangent line of the first recessed groove 34 agree with each other at the connection position between the two portions (both tangent lines are indicated by the symbol L). These tangent lines L are disposed perpendicular to the joining surface M. However, these tangent lines L may be inclined with respect to the direction perpendicular to the joining surface M.

The pipe body 24 includes a second recessed groove 36 and a second curved portion 37 formed in the second plate 22. The second recessed groove 36 is formed in an arc shape in the cross section of the pipe body 24. More specifically, the second recessed groove 36 is formed in a semicircular shape. The center O2 of the semicircle of the second recessed groove 36 is located on the second plate 22 side of the joining surface M (lower side in FIG. 5). In other words, the center O2 of the semicircle of the second recessed groove 36 is located on the side where the second recessed groove 36 is recessed from the joining surface M in the first direction.

The second curved portion 37 is disposed between the second recessed groove 36 and the second flat plate portion 32. The second curved portion 37 is curved to rise in the first direction from the second flat plate portion 32 (joining surface M) toward the end of the second recessed groove 36. The second curved portion 37 of one or more embodiments is formed in an arc shape that curves at about 90°. The end on the second recessed groove 36 side of the second curved portion 37 and the end of the second recessed groove 36 are smoothly connected to each other. Therefore, the tangent line of the second curved portion 37 and the tangent line of the second recessed groove 36 agree with each other at the connection position between the two portions (both tangent lines are indicated by the symbol L). These tangent lines L are disposed perpendicular to the joining surface M. However, these tangent lines L may be inclined with respect to the direction perpendicular to the joining surface M.

The first recessed groove 34 and the second recessed groove 36 are identical in shape. Therefore, the radius of curvature of the arc shape of the first recessed groove 34 in the cross section is identical to the radius of curvature of the arc shape of the second recessed groove 36. The first curved portion 35 and the second curved portion 37 are identical in shape. Therefore, the radius of curvature of the first curved portion 35 and the radius of curvature of the second curved portion 37 are identical to each other. The first recessed groove 34 and the first curved portion 35 agree with the second recessed groove 36 and the second curved portion 37 in position in the second direction.

Figure 11:
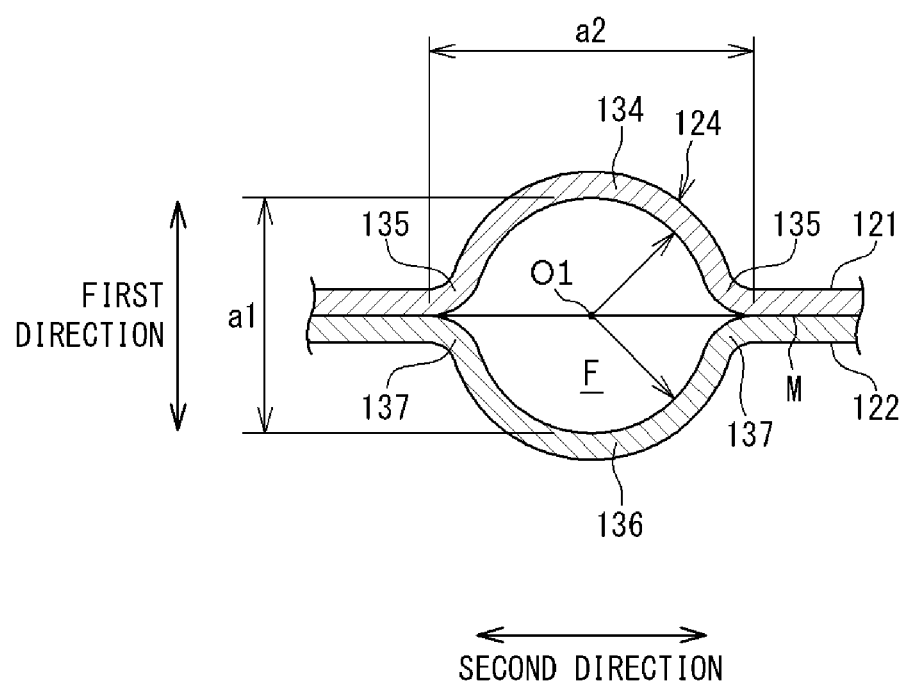
FIG. 11 is a cross-sectional view showing a comparative example of a pipe body.

FIG. 11 is a cross-sectional view showing a comparative example of the pipe body.

A pipe body 124 includes a first recessed groove 134 and a first curved portion 135 formed in a first plate 121, and a second recessed groove 136 and a second curved portion 137 formed in a second plate 122. The center O1 of arcs of the first recessed groove 134 and the second recessed groove 136 is on the joining surface M. Therefore, the internal size a1 of the pipe body 124 in the first direction is twice the radius of the inner surface of the first recessed groove 134 and the second recessed groove 136 (surface on the refrigerant flow path F side). When only the first recessed groove 134 and the second recessed groove 136 are viewed, the cross section of the refrigerant flow path F within the pipe body 124 is a substantially perfect circle. However, the substantial internal size a2 of the pipe body 124 in a direction along the joining surface M, which includes the curved portions 135 and 137, is larger than twice the radius of the inner surface of the first recessed groove 134 and the second recessed groove 136.

When the refrigerant flows through the refrigerant flow path F in the pipe body 124, pressure from the refrigerant acts to bring the cross section of the pipe body 124 closer to a perfect circle. Since the size a2 in the second direction is larger than the size a1 in the first direction, force to expand the pipe body 124 in the first direction is applied to the pipe body 124 of the comparative example shown in FIG. 11. Since this force acts in the direction of peeling off the first plate 121 and the second plate 122, the load applied to the joining surface M between the first plate 121 and the second plate 122 may increase, adversely affecting durability.

In one or more embodiments, as shown in FIG. 5, the internal size a1 of the pipe body 24 in the first direction is obtained by adding heights of the first curved portion 35 and the second curved portion 37 in the first direction to twice the radius of the inner surface of the first recessed groove 34 and the second recessed groove 36 (surface on the refrigerant flow path F side). The internal size a2 of the pipe body 24 in the second direction is obtained by adding the sizes of the first curved portion 35 and the second curved portion 37 in the second direction to twice the radius of the inner surface of the first recessed groove 34 and the second recessed groove 36. Since both the size a1 and size a2 are nearly identical, when the refrigerant flows through the refrigerant flow path F inside the pipe body 24, the force to expand the pipe body 24 in the first direction is smaller than in the comparative example shown in FIG. 11. Rather, since the size a1 in the first direction is larger than the size a3 in the second direction of the main part of the refrigerant flow path F excluding the curved portions 35 and 37, the force to expand the pipe body 24 in the second direction increases. Therefore, the force to peel off the first plate 21 and the second plate 22 becomes relatively small, and the durability of the plate-type refrigerant pipe 20 can be improved.

The pipe body 24 in the other pipe portions 24B to 24D also has a configuration identical to the pipe body 24 of the pipe portion 20A described above.

(Configuration of Connection Portion 25)

Figure 6:
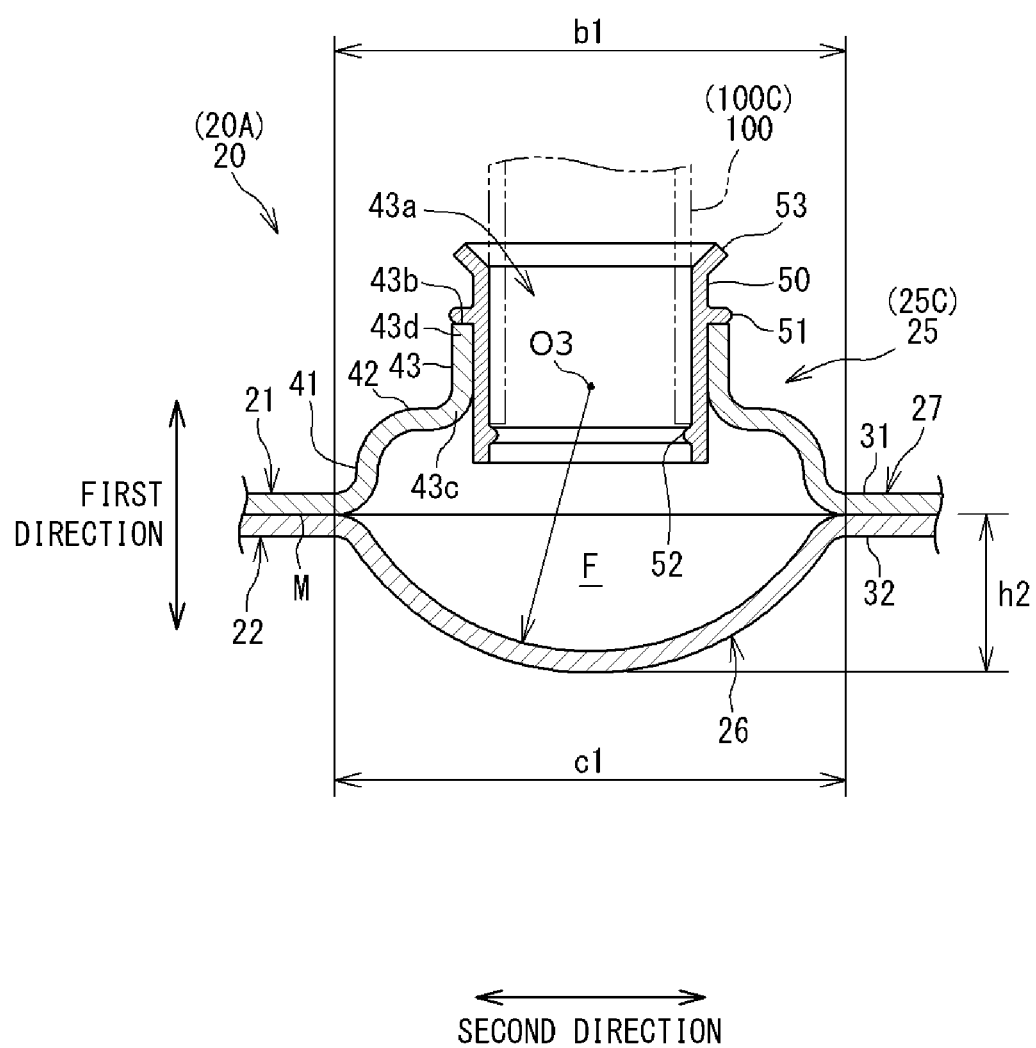
FIG. 6 is a cross-sectional view taken along the line B-B in FIG. 2.

FIG. 6 is a cross-sectional view taken along the line B-B in FIG. 2. The connection portion 25 and the closed portion 26 are provided at a first end of the pipe portion 20A of the first pattern.

The connection portion 25 is provided to connect another refrigerant pipe 100 to the pipe portion 20A. In the example shown in FIG. 6, the connection portion 25 is formed in the first plate 21. The connection portion 25 includes a concave portion that is recessed to the first plate 21 side from the joining surface M in the first direction. The connection portion 25 includes an outer peripheral wall 41 that is curved and rises from the first flat plate portion 31 in the substantially first direction, and a top face portion 42 disposed at the tip of the outer peripheral wall 41 and disposed substantially in parallel to the joining surface M. When the plate-type refrigerant pipe 20 is viewed from outside, the outer peripheral wall 41 and the top face portion 42 constitute a protrusion that protrudes to the first plate 21 side from the joining surface M.

As shown in FIG. 2, the connection portion 25 is formed in a circular shape when viewed from the first direction. Specifically, the shape of an outer peripheral edge 25a of the connection portion 25, which is a boundary portion between the outer peripheral wall 41 and the first flat plate portion 31, is formed in a circular shape. The shape of the outer peripheral edge of the top face portion 42 is also formed in a circular shape.

As shown in FIG. 6, a cylindrical portion 43 is formed at the center of the circular shape of the top face portion 42. The cylindrical portion 43 is formed in a cylindrical shape along the first direction. The cylindrical portion 43 protrudes from the top face portion 42 in the first direction away from the joining surface M. An opening 43a is formed in a pipe of the cylindrical portion 43. The opening 43a is used to connect the other refrigerant pipe 100, as will be described later. In the following description, out of two ends of the cylindrical portion 43 in the first direction, the end connected to the top face portion 42 and closer to the joining surface M is also referred to as "proximal end 43c", and the end further away from the joining surface M is also referred to as "distal end 43d". The end face of the cylindrical portion 43 at the distal end 43d is also referred to as "distal face 43b".

A coupling pipe 50 is attached to the cylindrical portion 43. The coupling pipe 50 includes a material different from stainless steel, which is the material of the first and second plates 21 and 22. The coupling pipe 50 is formed using the same material as the other refrigerant pipe 100. For example, the coupling pipe 50 is made of copper. The coupling pipe 50 is formed in a cylindrical shape. The coupling pipe 50 is inserted into a pipe of the cylindrical portion 43. The other refrigerant pipe 100 is inserted into the coupling pipe 50. The inner peripheral surface of the coupling pipe 50 and the outer peripheral surface (connected surface) of the other refrigerant pipe 100 are joined by brazing. The other refrigerant pipe 100 is made of the same copper as the coupling pipe 50, but only a portion that is in contact with the coupling pipe 50 (connected surface) may be made of copper, and other portions may be made of other materials such as stainless steel.

The length in the first direction (pipe axis direction) of the coupling pipe 50 is longer than the length in the first direction of the cylindrical portion 43. The coupling pipe 50 protrudes further outward of the plate-type refrigerant pipe 20 from the distal end 43d of the cylindrical portion 43. Specifically, the coupling pipe 50 protrudes away from the joining surface M from the distal face 43b of the cylindrical portion 43 in the first direction. The coupling pipe 50 protrudes to the joining surface M side from the proximal end 43c of the cylindrical portion 43 in the first direction.

An enlarged diameter portion 53, which is bent such that the inner diameter becomes larger at the distal side, is provided at the distal end of the coupling pipe 50, which protrudes outward of the cylindrical portion 43. The enlarged diameter portion 53 serves as a guide when inserting the other refrigerant pipe 100 into the coupling pipe 50.

When brazing the inner peripheral surface of the coupling pipe 50 and the outer peripheral surface of the other refrigerant pipe 100, the enlarged diameter portion 53 can facilitate the inflow of a brazing material between the two surfaces.

The coupling pipe 50 is joined to the cylindrical portion 43 by brazing. Specifically, the brazing material is poured into a gap between the outer peripheral surface of the coupling pipe 50 and the inner peripheral surface of the cylindrical portion 43, whereby the outer peripheral surface of the coupling pipe 50 and the inner peripheral surface of the cylindrical portion 43 are joined. The coupling pipe 50 and the cylindrical portion 43 are joined by in-furnace brazing. The cylindrical portion 43 and the coupling pipe 50 undergo in-furnace brazing for the following reason.

Since a passive film (oxide film) is formed on a surface of stainless steel as a material of the cylindrical portion 43 (first plate 21), a flux for removing the oxide film is required to execute manual brazing such as torch brazing (hereinafter, also referred to as "hand brazing"). Since the refrigerant flows in the refrigerant circuit 4, which is a closed circuit, if the flux remains in the plate-type refrigerant pipe 20, the flux may be mixed in the refrigerant, which may adversely affect performance of the refrigerant itself or an element component into which the refrigerant flows. Therefore, the work of removing the flux after brazing is essential.

Stainless steel causes embrittlement called sensitization when heated. Sensitization is a phenomenon in which chromium is bound to carbon in stainless steel, and the chromium is precipitated at a grain boundary, and thus a part having a low chromium component is generated to reduce corrosion resistance or the like. A temperature range and an application time of the heat in which sensitization is likely to occur are known.

The in-furnace brazing is a method of executing brazing in a predetermined gas atmosphere, for example, in a hydrogen gas atmosphere capable of removing an oxide film inside a continuous furnace or the like. Therefore, it is possible to braze stainless steel without using flux. This eliminates the need for removing the flux after brazing. The in-furnace brazing makes it easy to manage the brazing temperature and brazing time, making it possible to execute brazing at a temperature and time that can inhibit occurrence of sensitization. Sensitization of the first plate 21 can be inhibited by using SUS304L having a smaller carbon amount than SUS304 as the first plate 21. A specific mode of the in-furnace brazing between the coupling pipe 50 and the cylindrical portion 43 will be described later.

When the coupling pipe 50 made of copper is exposed to a high temperature in a furnace for in-furnace brazing, the crystal grains may become coarse and the strength may decrease. In one or more embodiments, the other refrigerant pipe 100 inserted into the coupling pipe 50 overlaps the cylindrical portion 43 in the pipe diameter direction. Accordingly, the coupling pipe 50 overlaps the cylindrical portion 43 and/or the other refrigerant pipe 100 in the pipe diameter direction, except for a portion protruding into the refrigerant flow path F. Therefore, a decrease in strength of the coupling pipe 50 associated with the in-furnace brazing is compensated by the cylindrical portion 43 and/or the other refrigerant pipe 100.

Since the connection portion 25 is provided with the cylindrical portion 43 extending along the first direction, the joining length (overlapping length) between the connection portion 25 and the other refrigerant pipe 100 in the first direction can be made as long as possible. Therefore, the connection portion 25 and the other refrigerant pipe 100 can be firmly connected.

A first projection 51 is provided on the outer peripheral surface of the coupling pipe 50. The first projection 51 is continuous over the entire circumference of the outer peripheral surface of the coupling pipe 50. The first projection 51 is in contact with the distal face 43b of the cylindrical portion 43. The first projection 51 sets the amount of protrusion of the coupling pipe 50 from the distal face 43b of the cylindrical portion 43. The first projection 51 also sets the amount of protrusion of the coupling pipe 50 from the proximal end 43c of the cylindrical portion 43. The first projection 51 constitutes a first positioning mechanism that executes positioning of the coupling pipe 50 with respect to the cylindrical portion 43 in the pipe axis direction. The first projection 51 may be provided in part of the circumferential direction on the outer peripheral surface of the coupling pipe 50. The first projection 51 may be formed at a plurality of positions at intervals in the circumferential direction on the outer peripheral surface of the coupling pipe 50.

The first positioning mechanism may be configured by expanding the outer diameter and the inner diameter of the coupling pipe 50, as in the enlarged diameter portion 53 described above. The first positioning mechanism may include the enlarged diameter portion 53 itself. In this case, by bringing the enlarged diameter portion 53 into contact with the distal face 43b of the cylindrical portion 43, positioning of the coupling pipe 50 in the pipe axis direction with respect to the cylindrical portion 43 can be executed.

A second projection 52 is provided on the inner peripheral surface of the coupling pipe 50. The second projection 52 is continuous over the entire circumference of the inner peripheral surface of the coupling pipe 50. The second projection 52 sets the insertion amount of the other refrigerant pipe 100 inserted into the coupling pipe 50 into the coupling pipe 50. The second projection 52 can inhibit the insertion of the other refrigerant pipe 100 into the coupling pipe 50 from being insufficient and can secure the overlap margin between the other refrigerant pipe 100 and the cylindrical portion 43 in the first direction. The second projection 52 constitutes a second positioning mechanism that executes positioning of the other refrigerant pipe 100 in the pipe axis direction with respect to the coupling pipe 50. The second positioning mechanism may be configured by decreasing the outer diameter and inner diameter of the end of the coupling pipe 50 on the joining surface M side.

The coupling pipe 50 and the other refrigerant pipe 100 are joined by manual brazing. The coupling pipe 50 and the other refrigerant pipe 100, both of which are made of copper, can be easily connected by brazing by using an inexpensive brazing material such as phosphor copper brazing. Since the coupling pipe 50 protrudes into the refrigerant flow path F side of the proximal end 43c of the cylindrical portion 43, even if the brazing material that has flowed into the gap between the inner peripheral surface of the coupling pipe 50 and the outer peripheral surface of the other refrigerant pipe 100 flows downward in FIG. 6, the brazing material rarely reaches the inner surface of the top face portion 42 or the outer peripheral wall 41 of the connection portion 25, and it is possible to inhibit the brazing material from adhering to these portions and remaining. Since the second projection 52 is provided on the inner peripheral surface of the coupling pipe 50, the brazing material flowing downward between the inner peripheral surface of the coupling pipe 50 and the outer peripheral surface of the other refrigerant pipe 100 is blocked by the second projection 52, making it possible to inhibit the further downward flow.

As shown in FIG. 6, a flow path width b1 in the cross section of the connection portion 25 is formed larger than a flow path width a3 in the cross section of the first recessed groove 34 of the pipe body 24 shown in FIG. 5. The flow path width b1 in the cross section of the connection portion 25 is formed larger than a flow path width a2 in the cross section of the pipe body 24. This makes it possible to easily form a structure for connecting the other refrigerant pipe 100 to the pipe portion 20A to cause the refrigerant flow path F to communicate with the other refrigerant pipe 100. Conversely, the flow path width a3 in the cross section of the first recessed groove 34 and the flow path width a2 in the cross section of the pipe body 24 are smaller than the flow path width b1 in the cross section of the connection portion 25, making it possible to decrease the area under pressure from the refrigerant. Therefore, the load received by the inner surface of the first recessed groove 34 from the refrigerant can be reduced, and the force for peeling off the first plate 21 and the second plate 22 can be further reduced.

(Configuration of Closed Portion 26)

In the example shown in FIG. 6, the closed portion 26 is formed in the second plate 22. The closed portion 26 is disposed at an end of the refrigerant flow path F and stops the flow of refrigerant from the joining surface M to the second plate 22 side in the first direction. The closed portion 26 includes a concave portion that is recessed to the second plate 22 side from the joining surface M in the first direction. The closed portion 26 is formed in a spherical shape. Therefore, the closed portion 26 is formed in an arc shape in the cross section. As shown in FIG. 3, when viewed from the first direction, an outer peripheral edge 26a, which is a boundary between the closed portion 26 and the second flat plate portion 32, is formed in a circular shape.

As shown in FIG. 6, the center O3 of the spherical shape of the closed portion 26 is located on the first plate 21 side of the joining surface M. In other words, the center O3 of the spherical shape of the closed portion 26 is located on the opposite side of the side where the closed portion 26 is recessed across the joining surface M. The height h2 of the closed portion 26 from the joining surface M is identical to the height h1 of the second recessed groove 36 in the pipe body 24 from the joining surface M, as shown in FIG. 5. The inner height of the closed portion 26 from the joining surface M (depth of the closed portion 26) is identical to the inner height of the second recessed groove 36 from the joining surface M (depth of the second recessed groove 36).

The shape of the outer peripheral edge 26a of the closed portion 26 viewed from the first direction (see FIG. 3) is identical to the shape of the outer peripheral edge 25a of the connection portion 25 viewed from the first direction (see FIG. 2). The closed portion 26 and the connection portion 25 are disposed facing each other in the first direction. The outer peripheral edge 26a of the closed portion 26 and the outer peripheral edge 25a of the connection portion 25 agree with each other in position in the direction along the joining surface M. In other words, the outer peripheral edge 26a of the closed portion 26 and the outer peripheral edge 25a of the connection portion 25 overlap each other in the first direction.

Figure 12:
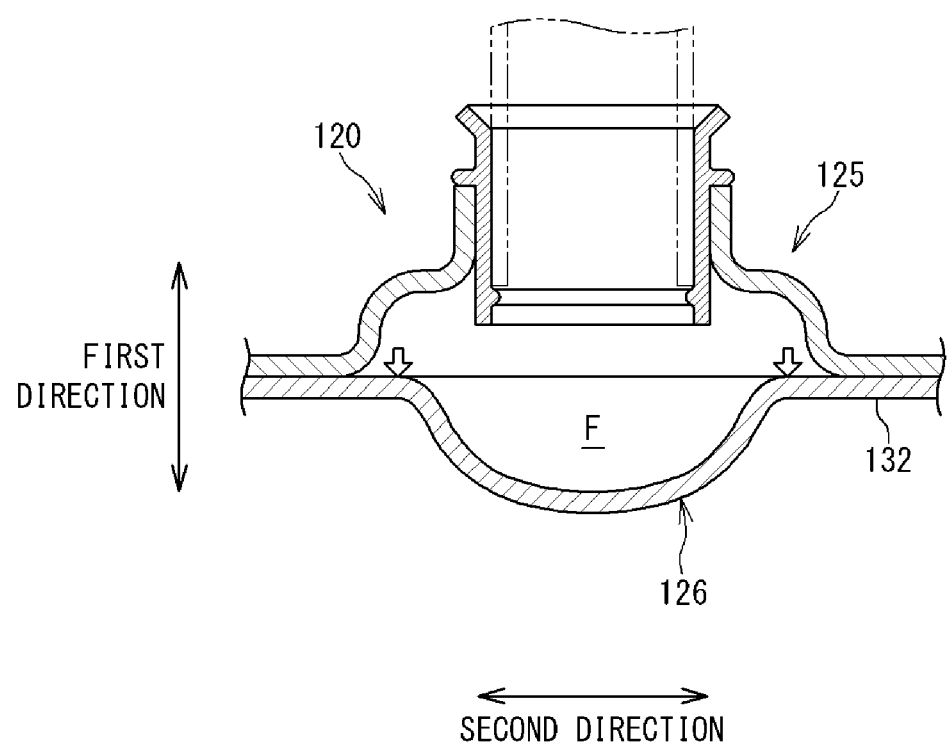
FIG. 12 is a cross-sectional view showing a comparative example of a connection portion and a closed portion.

FIG. 12 is a cross-sectional view showing a comparative example of the connection portion and the closed portion. In the comparative example shown in FIG. 12, the shape of the outer peripheral edge in a closed portion 126 is formed in a circular shape smaller than the shape of the outer peripheral edge in a connection portion 125. When the refrigerant flows through the refrigerant flow path F between the closed portion 126 and the connection portion 125, the pressure from the refrigerant is applied to the inner surfaces of the connection portion 125 and the closed portion 126. At this time, since a second flat plate portion 132 disposed around the closed portion 126 is greatly exposed in the refrigerant flow path F, the pressure from the refrigerant is applied in the first direction perpendicular to the second flat plate portion 132, as indicated by the hollow arrow. This pressure causes force to peel off the first plate 121 and the second plate 122 to be applied to a plate-type refrigerant pipe 120, adversely affecting durability of the plate-type refrigerant pipe 120.

In one or more embodiments, since the shape of the outer peripheral edge 26a of the closed portion 26 is identical to the shape of the outer peripheral edge 25a of the connection portion 25 when viewed from the first direction, the force in the first direction received from the refrigerant flowing through the refrigerant flow path F is smaller than in the comparative example shown in FIG. 12. Therefore, the durability of the plate-type refrigerant pipe 20 can be improved.

A flow path width c1 in the cross section of the closed portion 26 shown in FIG. 6 is formed larger than the flow path width a3 in the cross section of the second recessed groove 36 of the pipe body 24 shown in FIG. 5. The flow path width c1 in the cross section of the closed portion 26 is formed larger than the flow path width a2 in the cross section of the pipe body 24. As the flow path width c1 in the cross section of the closed portion 26 increases in this way, the area that receives the pressure from the refrigerant increases, and the load on the joining surface M of the first plate 21 and the second plate 22 also increases. However, since the first plate 21 and the second plate 22 are joined in most of the outer peripheral edge 26a viewed from the first direction, even if the flow path width c1 is increased, the closed portion 26 can secure sufficient pressure resistance.

Figure 7:
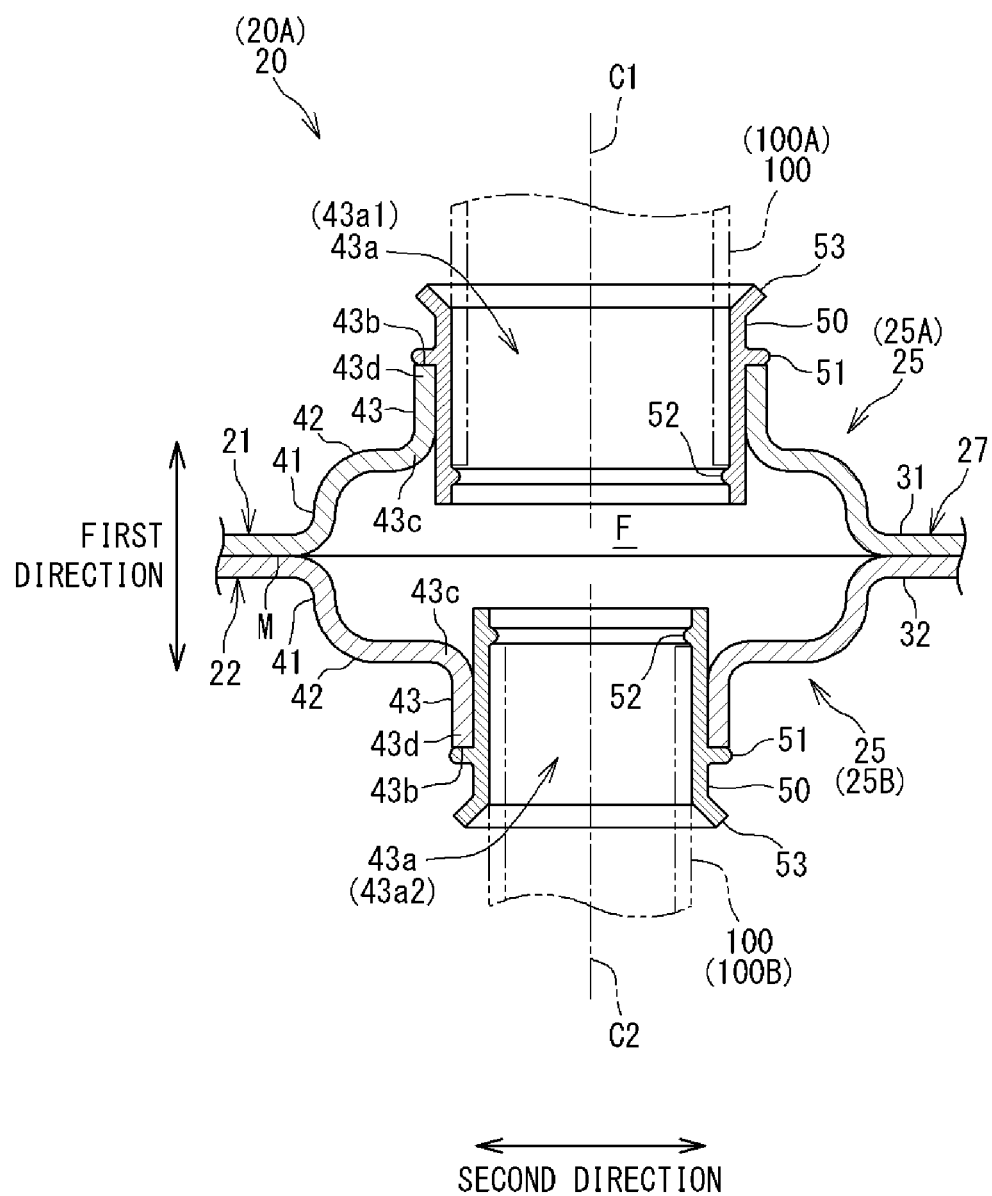
FIG. 7 is a cross-sectional view taken along the line C-C in FIG. 2.

FIG. 7 is a cross-sectional view taken along the line C-C in FIG. 2.

Two connection portions 25 are provided at a second end of the pipe portion 20A of the first pattern. One connection portion 25 (hereinafter also referred to as first connection portion 25A) is provided in the first plate 21, whereas the other connection portion 25 (hereinafter also referred to as second connection portion 25B) is provided in the second plate 22. The first and second connection portions 25A and 25B each include the outer peripheral wall 41, the top face portion 42, the cylindrical portion 43, and the coupling pipe 50, in a similar manner to the connection portion 25 described with reference to FIG. 6 (hereinafter also referred to as third connection portion 25C). The first connection portion 25A and the second connection portion 25B have the same basic configuration as the third connection portion 25C, although sizes such as the size of the circular shape of the outer peripheral edge 25a viewed from the first direction and the sizes of the inner and outer diameters of the cylindrical portion 43 and the coupling pipe 50 differ. In particular, the sizes of the outer peripheral wall 41, the top face portion 42, the cylindrical portion 43, and the coupling pipe 50 in the first direction (height from the joining surface M) are common to all the connection portions 25. A protrusion (outer peripheral wall 41 and top face portion 42) in the first connection portion 25A is also referred to as first protrusion. A protrusion (outer peripheral wall 41 and top face portion 42) in the second connection portion 25B is also referred to as second protrusion. A protrusion (outer peripheral wall 41 and top face portion 42) in the third connection portion 25C is also referred to as third protrusion.

As shown in FIG. 7, the first connection portion 25A and the second connection portion 25B are disposed to overlap each other in the first direction. The shape of the outer peripheral edge 25a in the first connection portion 25A viewed from the first direction as shown in FIG. 2 is identical to the shape of the outer peripheral edge 25a in the second connection portion 25B viewed from the first direction as shown in FIG. 3. The outer peripheral edge 25a of the first connection portion 25A and the outer peripheral edge 25a of the second connection portion 25B agree with each other in position in the direction along the joining surface M. In other words, the outer peripheral edge 25a of the first connection portion 25A and the outer peripheral edge 25a of the second connection portion 25B overlap each other in the first direction. An opening (first opening) 43a1 defined by the inner peripheral wall of the cylindrical portion (first cylindrical portion) 43 in the first connection portion 25A, and an opening (second opening) 43a2 defined by the inner peripheral wall of the cylindrical portion (second cylindrical portion) 43 in the second connection portion 25B overlap each other in the first direction. Specifically, an axis C1 of the first cylindrical portion 43 in the first connection portion 25A agrees with an axis C2 of the second cylindrical portion 43 in the second connection portion 25B. Similarly, the axis C1 of the coupling pipe 50 of the first connection portion 25A agrees with the axis C2 of the coupling pipe 50 of the second connection portion 25B.

Figure 8:
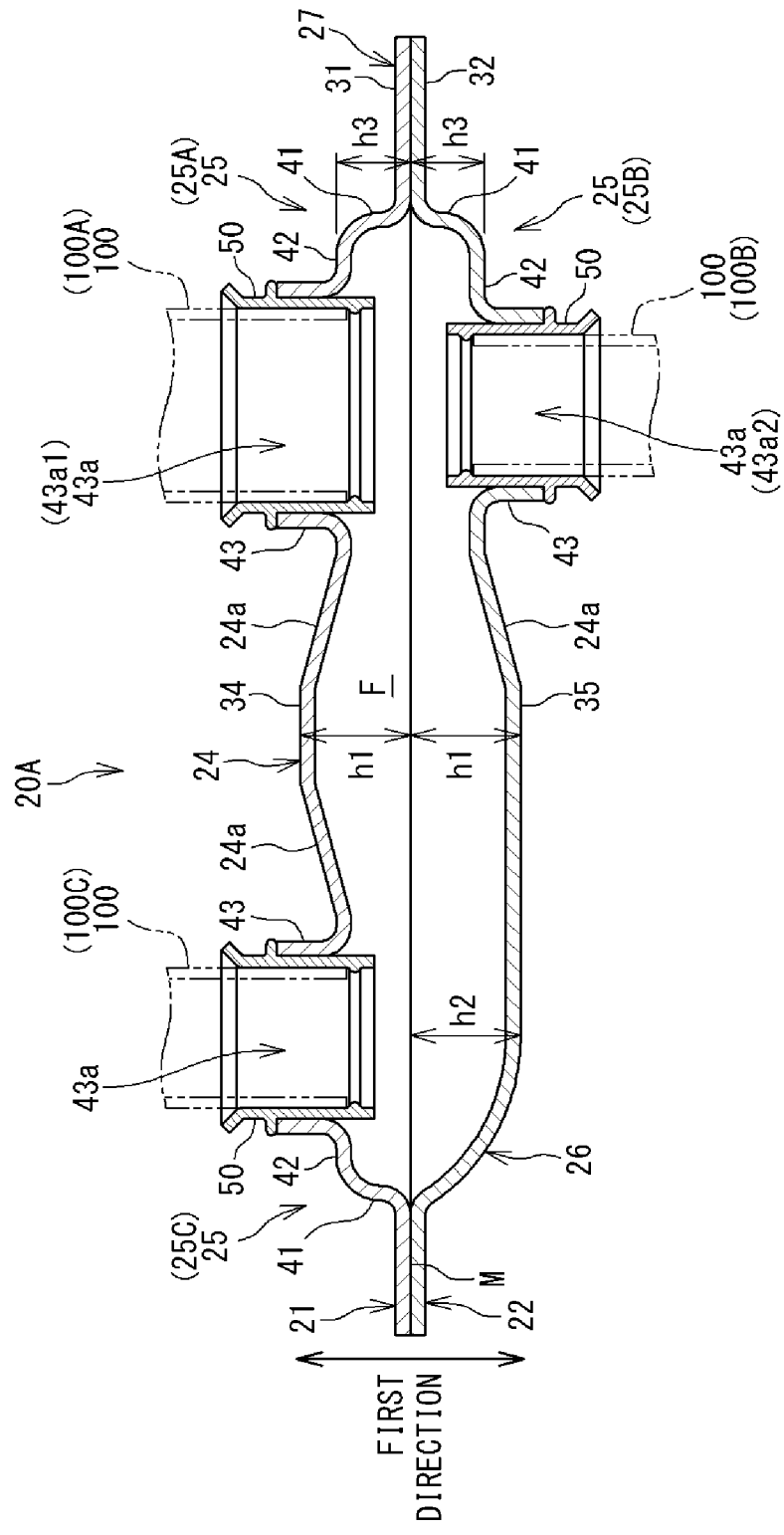
FIG. 8 is a cross-sectional view taken along the line D-D in FIG. 2.

FIG. 8 is a cross-sectional view taken along the line D-D in FIG. 2.

The pipe portion 20A of the first pattern includes the first connection portion 25A and the second connection portion 25B at the first end, and the third connection portion 25C and the closed portion 26 at the second end. Therefore, for example, the refrigerant that has flowed into the pipe portion 20A from another refrigerant pipe 100 connected to the third connection portion 25C (hereinafter also referred to as third refrigerant pipe 100C) flows through the pipe body 24, branches into another refrigerant pipe 100 connected to the first connection portion 25A (hereinafter also referred to as first refrigerant pipe 100A), and another refrigerant pipe 100 connected to the second connection portion 25B (hereinafter also referred to as second refrigerant pipe 100B), and is discharged.

Therefore, one refrigerant flow path F allows the first refrigerant pipe 100A, the second refrigerant pipe 100B, and the third refrigerant pipe 100C to communicate with one another. Therefore, the refrigerant flow path F can be made shorter than, for example, when connecting the refrigerant pipes 100A, 100B, and 100C to different refrigerant flow paths F and causing the refrigerant flow paths F to cross and communicate with each other. In the plate-type refrigerant pipe 20, as the refrigerant flow path F becomes longer, the load received from the refrigerant increases, and the load applied to the joining surface M between the first plate 21 and the second plate 22 increases. Therefore, as in one or more embodiments, the load on the joining surface M can be reduced by providing the first and second connection portions 25A and 25B at one end of one refrigerant flow path F and providing the third connection portion 25C at the other end of the refrigerant flow path F.

The pipe body 24 between the first connection portion 25A and the second connection portion 25B, and the third connection portion 25C is formed in a straight line when viewed from the first direction. Therefore, the refrigerant flow path F between the first connection portion 25A and the second connection portion 25B, and the third connection portion 25C can be made shortest, and the load on the joining surface M as described above can be further reduced.

The cross-sectional area of the refrigerant flow path F in the pipe body 24 is larger than the cross-sectional area of the refrigerant flow path of the second refrigerant pipe 100B connected to the second connection portion 25B, and the cross-sectional area of the refrigerant flow path of the third refrigerant pipe 100C connected to the third connection portion 25C. Therefore, the pressure loss of the refrigerant flowing from the second refrigerant pipe 100B or the third refrigerant pipe 100C to the pipe body 24 can be reduced.

The cross-sectional area of the refrigerant flow path F in the pipe body 24 is substantially the same as the cross-sectional area of the refrigerant flow path of the first refrigerant pipe 100A connected to the first connection portion 25A. Therefore, it is possible to reduce the pressure loss of the refrigerant flowing from the pipe body 24 to the first refrigerant pipe 100A, and the refrigerant flowing from the first refrigerant pipe 100A to the pipe body 24. The cross-sectional area of the refrigerant flow path F in the pipe body 24 may be larger than the cross-sectional area of the refrigerant flow path in the first refrigerant pipe 100A.

From the above description, the cross-sectional area of the refrigerant flow path F in the pipe body 24 is identical to or larger than the largest cross-sectional area of the cross-sectional areas of the refrigerant flow paths of the first refrigerant pipe 100A, the second refrigerant pipe 100B, and the third refrigerant pipe 100C. The cross-sectional area of the refrigerant flow path F in the pipe body 24 is larger than the smallest cross-sectional area of the cross-sectional areas of the refrigerant flow paths of the first refrigerant pipe 100A, the second refrigerant pipe 100B, and the third refrigerant pipe 100C.

As shown in FIG. 8, the height h1 of the longitudinal middle portion of the pipe body 24 in the first direction from the joining surface M is higher than the height h3 of the top face portion 42 of the first to third connection portions 25A to 25C in the first direction (top face of first to third protrusions) from the joining surface M. An inclined portion 24a whose height from the joining surface M gradually decreases toward the top face portion 42 of the first to third connection portions 25A to 25C is formed at the end of the pipe body 24. Formation of such an inclined portion 24a can reduce the change in the cross-sectional area of the refrigerant flow path F between the pipe body 24 and each of the connection portions 25A to 25C in the first direction, and can reduce the pressure loss of the refrigerant flowing through the refrigerant flow path F between the pipe body 24 and each of the connection portions 25A to 25C. In FIG. 8, the heights h1 and h3 of all the connection portions 25A to 25C and the middle part of the pipe body 24 are different. However, the height h3 of the top face portion 42 of any of the connection portions 25A to 25C and the height h1 of the longitudinal middle portion of the pipe body 24 may be identical.

As shown in FIG. 2, the other pipe portion 20B of the first pattern has the same basic configuration as the above-described pipe portion 20A, although there are differences in size.

[Pipe Portion of Second Pattern]

Figure 9:
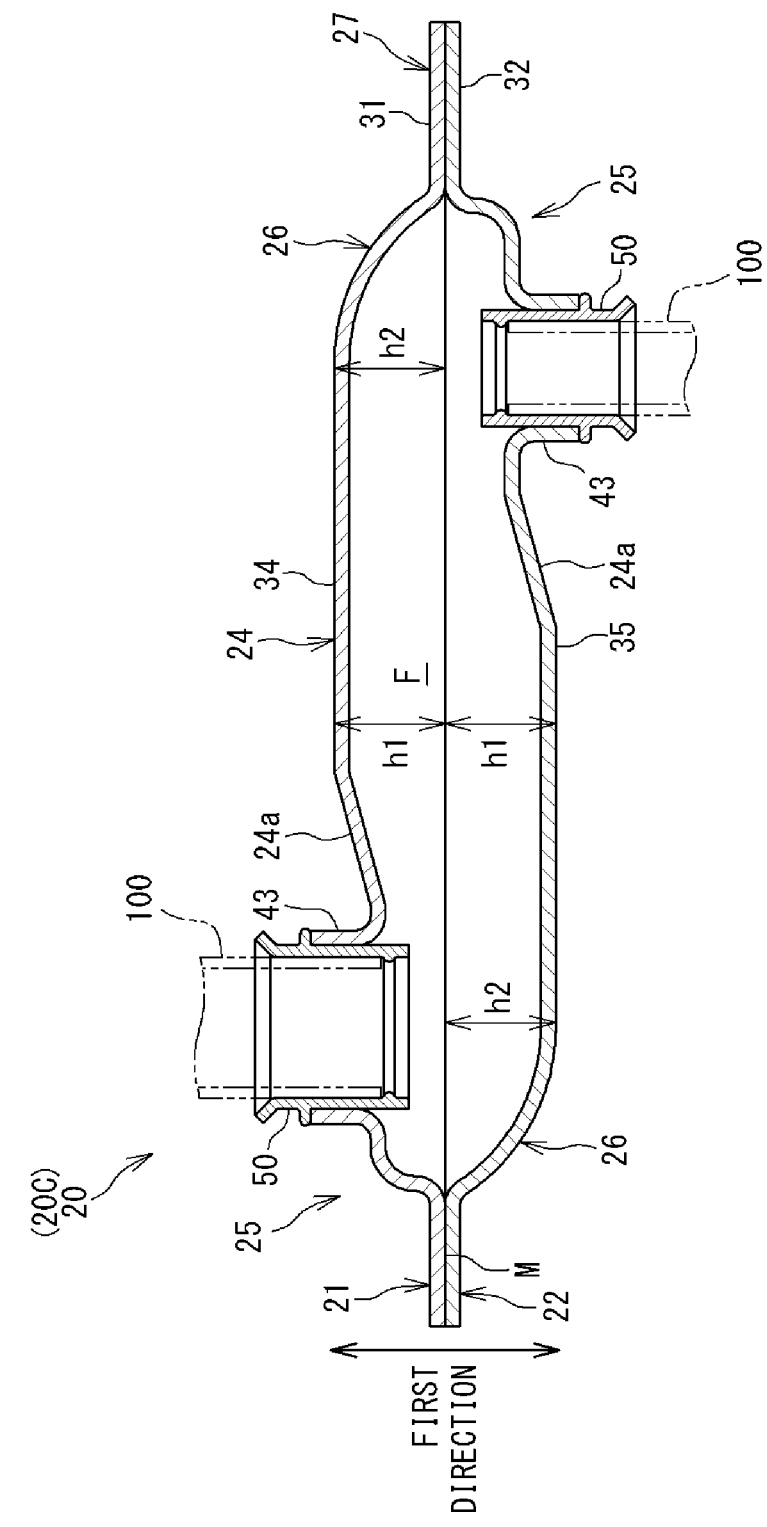
FIG. 9 is a cross-sectional view taken along the line E-E in FIG. 2.

FIG. 9 is a cross-sectional view taken along the line E-E in FIG. 2.

As shown in FIG. 9, in the pipe portion 20C of the second pattern, the connection portion 25 is provided at a first end of the pipe body 24, and the closed portion 26 is provided at a second end of the pipe body 24 in the first plate 21. In the second plate 22, the closed portion 26 is provided at the first end of the pipe body 24, and the connection portion 25 is provided at the second end of the pipe body 24. Therefore, the connection portion 25 and the closed portion 26 are disposed to face each other in the first direction at each of the first end and the second end of the pipe body 24.

Each connection portion 25 and each closed portion 26 have the same basic configuration as the connection portion 25 and the closed portion 26 described in the first pattern, although there are differences in size.

[Pipe Portion of Third Pattern]

As shown in FIG. 2 and FIG. 3, in the pipe portion 20D of the third pattern, the pipe body 24 is bent at two points 20D1 and 20D2 in the middle of the longitudinal direction. At the first end of the pipe body 24, the connection portion 25 is provided on the first plate 21 side, and the connection portion 25 is also provided on the second plate 22 side. Both connection portions 25 are disposed facing each other in the first direction. At the second end of the pipe body 24, the closed portion 26 is provided on the first plate 21 side, and the connection portion 25 is provided on the second plate 22 side. The connection portion 25 and the closed portion 26 are disposed facing each other in the first direction. In the middle 20D1 of the pipe body 24, the connection portion 25 is provided on the first plate 21 side, and the closed portion 26 is provided on the second plate 22 side. The connection portion 25 and the closed portion 26 are disposed facing each other in the first direction. At the other middle point 20D2 of the pipe body 24, the closed portion 26 is provided on the first plate 21 side, and the connection portion 25 is provided on the second plate 22 side. The closed portion 26 and the connection portion 25 are disposed facing each other in the first direction. The connection portion 25 and the closed portion 26 described above have the same basic configuration as the connection portion 25 and the closed portion 26 shown in FIG. 6, although there are differences in size.

[Method of Joining Connection Portion 25 and Coupling Pipe 50]

Figure 10:
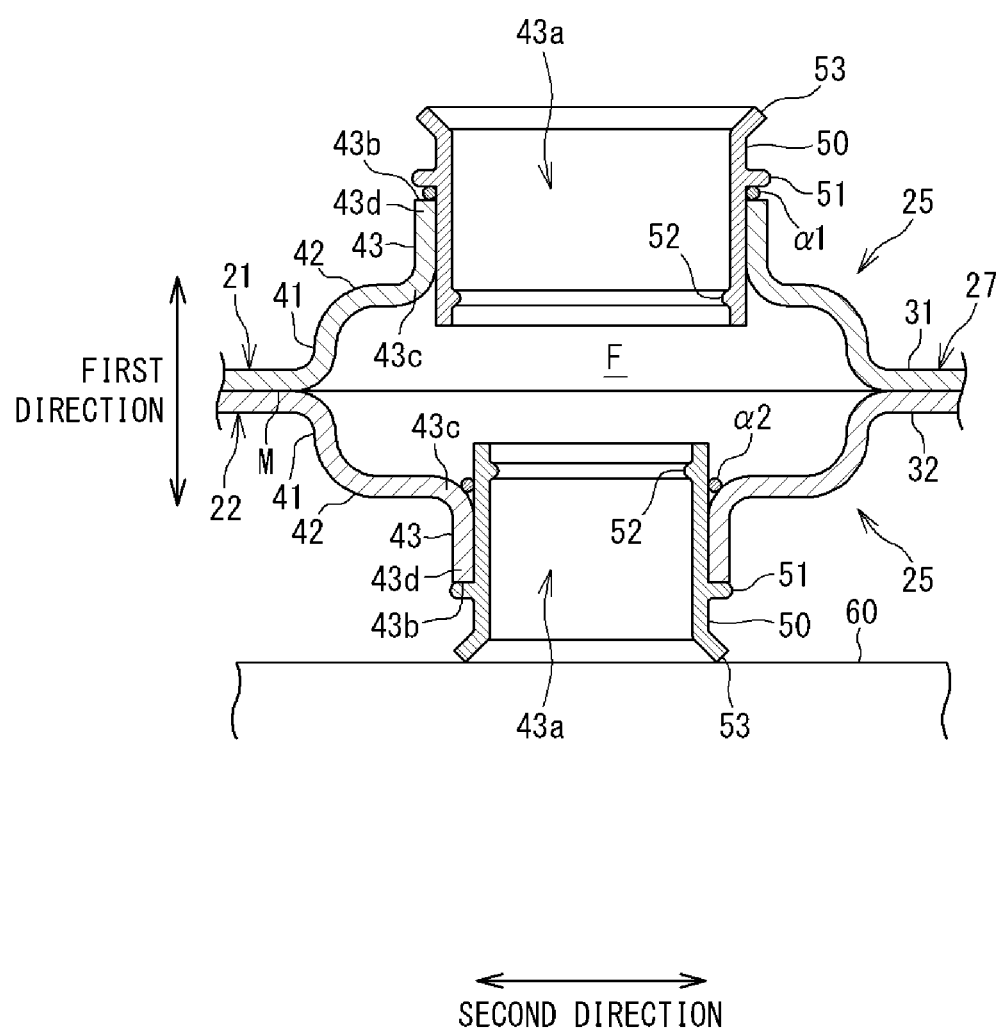
FIG. 10 is a cross-sectional view showing a state before joining a connection portion and a coupling pipe of the plate-type refrigerant pipe.

FIG. 10 is a cross-sectional view showing a state before joining the connection portion 25 and the coupling pipe 50 of the plate-type refrigerant pipe 20.

The first plate 21 and the second plate 22 are joined by in-furnace brazing, and the cylindrical portion 43 and the coupling pipe 50 of the connection portion 25 are joined by the in-furnace brazing. The first plate 21, the second plate 22, and the two coupling pipes 50 are put onto a conveyor 60 of a continuous furnace in a temporarily assembled state. At this time, a brazing material (not shown) is set between the first plate 21 and the second plate 22, and annular brazing materials (ring wax) α1 and α2 are set between the connection portion 25 and the coupling pipe 50.

Specifically, the first plate 21, the second plate 22, and the coupling pipes 50 undergo in-furnace brazing by the following procedure.

(1) Process of inserting the coupling pipe 50 into the cylindrical portion 43 of the connection portion 25 of the second plate 22 disposed on a lower side, and setting the brazing material α2;

(2) process of superimposing the first plate 21 on the second plate 22 with the brazing material positioned between the second plate 22 and the first plate 21;

(3) process of setting the brazing material α1 on the cylindrical portion 43 of the connection portion 25 in the first plate 21, and inserting the coupling pipe 50 into the cylindrical portion 43; and (4) process of putting the first plate 21, the second plate 22, and the coupling pipes 50 temporarily assembled in the above process into the furnace and executing in-furnace brazing.

Note that in the process of (2), as shown in FIG. 2 and FIG. 3, a jig is inserted into the first alignment portion 21a formed in the first flat plate portion 31 of the first plate 21 and the second alignment portion 22a formed in the second flat plate portion 32 of the second plate 22 to execute alignment between the first flat plate portion 31 and the second flat plate portion 32.

In the connection portion 25 of the first plate 21 disposed on the upper side, the ring wax α1 positioned on the outer peripheral surface of the coupling pipe 50 is set while sandwiched between the distal face 43b of the cylindrical portion 43 and the first projection 51 of the coupling pipe 50. Since the coupling pipe 50 protrudes from the distal face 43b of the cylindrical portion 43 in the first direction, it is easy to set the ring wax α1 on the outer peripheral surface of the coupling pipe 50.

In the connection portion 25 of the second plate 22 disposed on the lower side, the ring wax α2 positioned on the outer peripheral surface of the coupling pipe 50 protruding from the proximal end 43c of the cylindrical portion 43 to the joining surface M side is set on the proximal end 43c of the cylindrical portion 43. Since the coupling pipe 50 protrudes to the joining surface M side from the proximal end 43c of the cylindrical portion 43, the ring wax α2 can be set on the outer peripheral surface. Since the end of the coupling pipe 50 protrudes to the joining surface M side from the proximal end 43c of the cylindrical portion 43, the ring wax α2 set on the outer peripheral surface of the coupling pipe 50 does not flow to the inner peripheral surface side of the coupling pipe 50.

As shown in FIG. 4, the height H from the joining surface M of the first plate 21 and the second plate 22 to the coupling pipe 50 attached to each of the plates 21 and 22 is constant. Therefore, as shown in FIG. 10, the plate-type refrigerant pipe can be stably placed on the conveyor 60 with the coupling pipe 50 temporarily assembled on one of the plates 22 placed downside.

[Modification of Pipe Body]

Figure 13A:
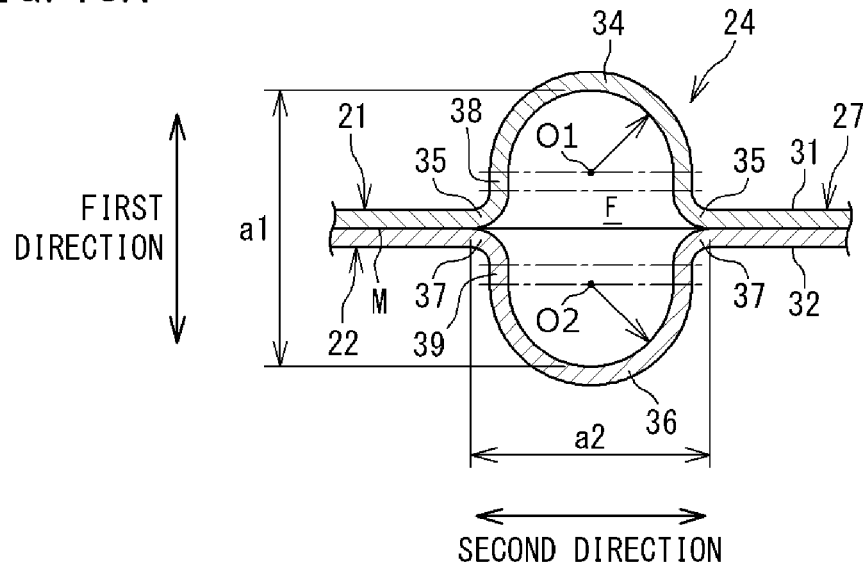
FIGS. 13A, 13B, and 13C are cross-sectional views showing a modification of a pipe body.
Figure 13B:
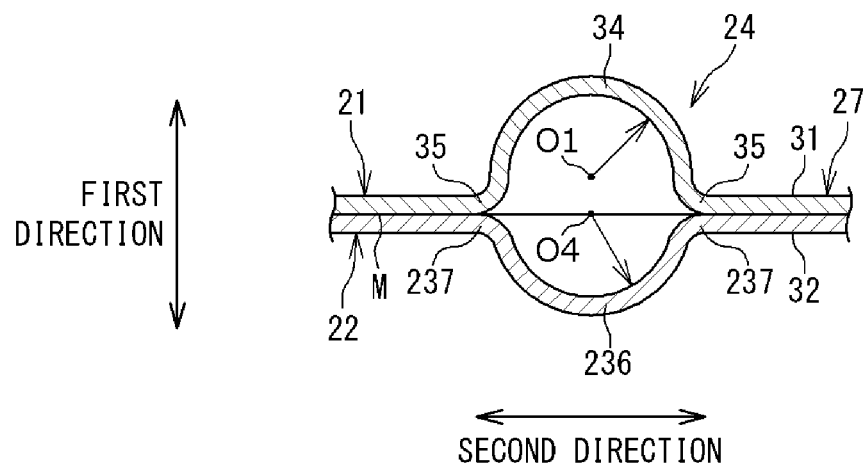
Figure 13C:
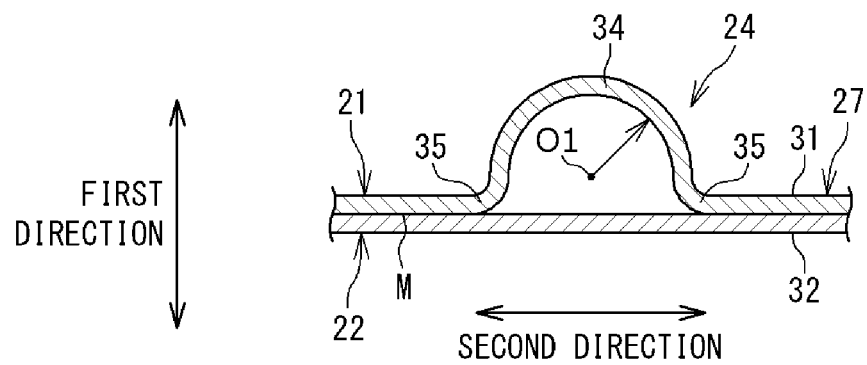

FIGS. 13A, 13B, and 13C are cross-sectional views showing a modification of the pipe body 24.

The pipe body 24 shown in FIG. 13A includes a straight portion 38 disposed straight along the first direction between the first recessed groove 34 and the first curved portion 35 formed in the first plate 21 in the cross section. The pipe body 24 includes a straight portion 39 disposed straight along the first direction between the second recessed groove 36 and the second curved portion 37 formed in the second plate 22. Therefore, the size a1 along the first direction of the refrigerant flow path F in the pipe body 24 is larger than the size a2 along the joining surface M. Therefore, even if pressure of the refrigerant flowing through the refrigerant flow path F in the pipe body 24 exerts force that brings the pipe body 24 closer to a perfect circle, the force is mainly in the direction along the joining surface M, making it possible to inhibit the force that peels off the first plate 21 and the second plate 22 from acting on the plate-type refrigerant pipe 20.

In the pipe body 24 shown in FIG. 13B, in the cross section, the first recessed groove 34 and the first curved portion 35 formed in the first plate 21 have the same shape as in the embodiments shown in FIG. 5, but a recessed groove 236 and a curved portion 237 formed in the second plate 22 are different from the embodiments. The center O4 of the arc of the recessed groove 236 is on the joining surface M as in the comparative example shown in FIG. 11. Even in such a pipe body 24, the first recessed groove 34 formed in the first plate 21 is the same as in the embodiments, making it more difficult for the force that peels off the first plate 21 and the second plate 22 to act on the plate-type refrigerant pipe 20 than in the comparative example shown in FIG. 11. This makes it possible to reduce the load on the joining surface between the first plate 21 and the second plate 22 and to increase the durability of the plate-type refrigerant pipe 20.

In the pipe body 24 shown in FIG. 13C, in the cross section, the first recessed groove 34 and the first curved portion 35 formed in the first plate 21 have the same shape as in the embodiments shown in FIG. 5, but the recessed groove and the curved portion are not formed in the second plate 22, and the second plate 22 is formed in a flat plate shape continuous from the second flat plate portion 32. In this case, the force in the direction of peeling off the first plate 21 and the second plate 22 is inhibited more than, for example, the pipe body formed by combining the recessed groove 134 and the curved portion 135 formed in the first plate 21 shown in FIG. 11 and the second plate 22 in FIG. 13C. This makes it possible to reduce the load on the joining surface between the first plate 21 and the second plate 22 and to increase the durability of the plate-type refrigerant pipe 20.

[Modification of Connection Portion]

Figure 14:
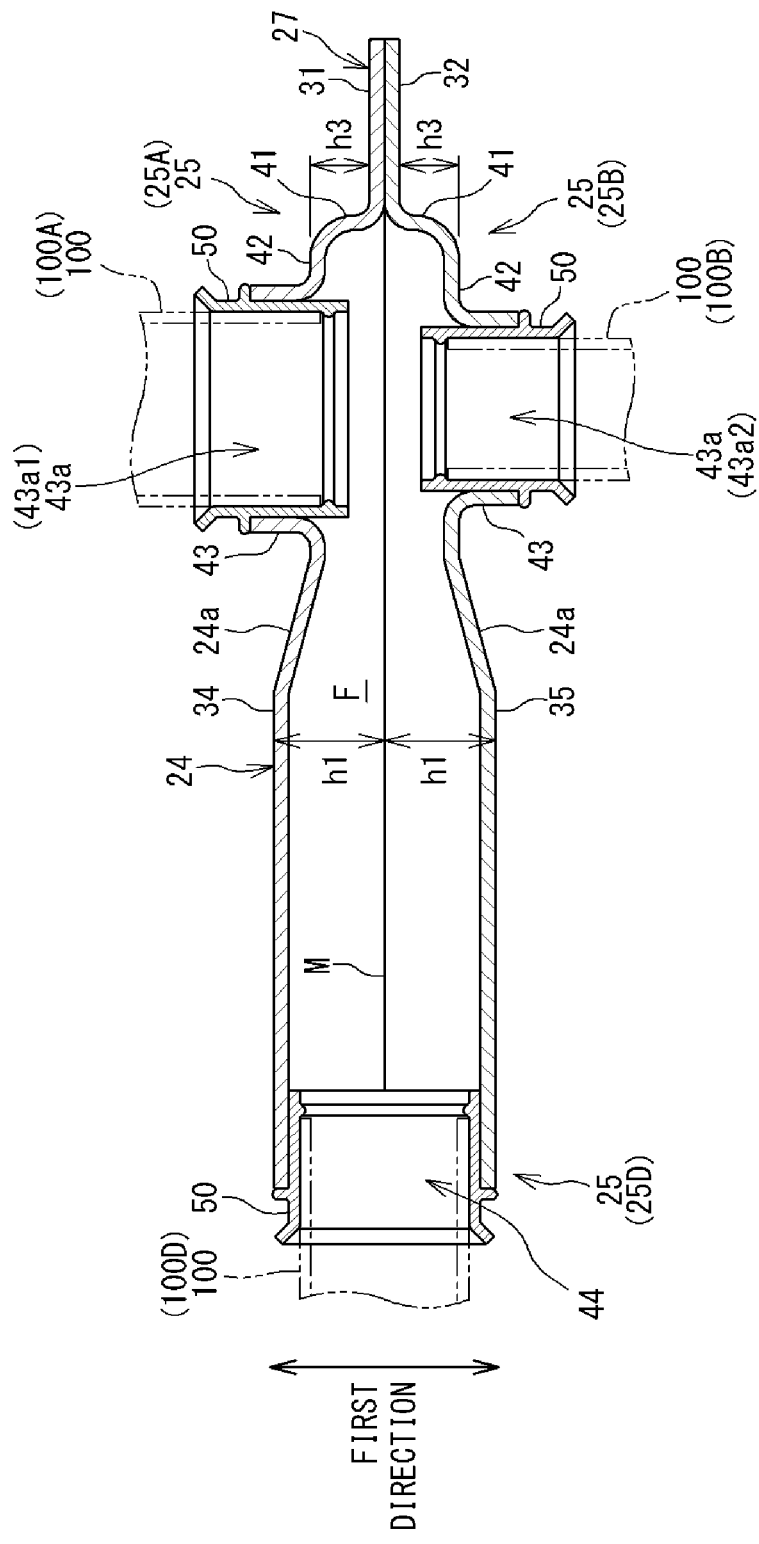
FIG. 14 is a cross-sectional view showing a modification of a connection portion.

FIG. 14 is a cross-sectional view showing a modification of the connection portion.

In a connection portion (third connection portion) 25D shown in FIG. 14, an opening 44 is formed in the direction along the joining surface M, and the coupling pipe 50 is attached to the opening 44. The opening 44 is disposed in the outer peripheral edge of the first plate 21 and the second plate 22. Another refrigerant pipe 100D is inserted into the coupling pipe 50 attached to the opening 44 and brazed. In the example shown in FIG. 14 as well, one refrigerant flow path F causes the first connection portion 25A, the second connection portion 25B, and the third connection portion 25D to communicate with each other.

[Other Embodiments]

In the embodiments described above, the coupling pipe 50 of the plate-type refrigerant pipe 20 and the other refrigerant pipe 100 are made of copper. However, these portions are not limited to made of copper and can be changed as appropriate. For example, the coupling pipe 50 and the other refrigerant pipe 100 can be made of copper alloy. The copper alloy is an alloy obtained by adding other metals or non-metals to copper, which is a main component, to improve properties of copper. Like copper, the copper alloy is a member that does not require flux treatment or the like and is easily brazed. As the copper alloy, for example, an alloy containing copper in an amount of 57 wt % or more is adopted. Specifically, as the copper alloy, brass, bronze, or the like can be adopted.

The coupling pipe 50 and the other refrigerant pipe 100 can be aluminum or aluminum alloy. The aluminum alloy is an alloy obtained by adding other metals or non-metals to aluminum, which is a main component, to improve properties of aluminum. As the aluminum alloy, for example, an alloy containing 90 wt % or more of aluminum is adopted.

Since copper, copper alloy, aluminum, and aluminum alloy are all applied widely as a refrigerant pipe forming a refrigerant circuit, it is possible to manufacture a refrigerant pipe with high versatility by forming the coupling pipe 50 with these materials.

In the present disclosure, the coupling pipe 50 of the plate-type refrigerant pipe 20 and the other refrigerant pipe 100 are made of an identical material. This "identical material" means that the metal of a main component is identical. Therefore, the "identical material" includes the case where one of the coupling pipe 50 and the other refrigerant pipe 100 is made of copper and the other is made of copper alloy, in addition to the case where the coupling pipe 50 and the other refrigerant pipe 100 are both made of copper or copper alloy. Similarly, the "identical material" includes the case where one of the coupling pipe 50 and the other refrigerant pipe 100 is made of aluminum and the other is made of aluminum alloy, in addition to the case where the coupling pipe 50 and the other refrigerant pipe 100 are both made of aluminum or aluminum alloy.

The coupling pipe 50 may be attached to the outer peripheral surface of the cylindrical portion 43 in the connection portion 25. In this case, the refrigerant pipe 100 is attached to the outer peripheral surface of the coupling pipe 50. The first projection 51 can be provided on the inner peripheral surface of the coupling pipe 50, and the second projection 52 can be provided on the outer peripheral surface of the coupling pipe 50.

The coupling pipe 50 may not protrude to the joining surface M side from the proximal end 43c of the cylindrical portion 43. In this case, positioning of the coupling pipe 50 in the pipe axis direction may be executed by forming the first projection 51 on the inner peripheral surface of the cylindrical portion 43 and bringing the end face of the coupling pipe 50 on the joining surface M side into contact with the first projection 51.

In FIG. 8, the third connection portion 25C may be provided on the second plate 22 side. The third connection portion 23C may be provided in both the first plate 21 and the second plate 22.

In FIG. 8, the cross-sectional area of the refrigerant flow path F in the pipe body 24 is larger than the cross-sectional area of the refrigerant flow path of the second refrigerant pipe 100B or the third refrigerant pipe 100C, and is approximately identical to the cross-sectional area of the refrigerant flow path of the first refrigerant pipe 100A. Instead of this, the cross-sectional area of the refrigerant flow path F in the pipe body 24 may be approximately identical to or smaller than the cross-sectional area of the refrigerant flow path of the second refrigerant pipe 100B and the third refrigerant pipe 100C, and may be smaller than the cross-sectional area of the refrigerant flow path of the first refrigerant pipe 100A.

In FIG. 7, the first connection portion 25A and the second connection portion 25B are required to overlap each other at least partially in the first direction. Similarly, the first opening 43a1 of the cylindrical portion 43 in the first connection portion 25A and the second opening 43a2 of the cylindrical portion 43 in the second connection portion 25B are required to overlap each other at least partly in the first direction. The axis C1 of the first opening 43a1 and the axis C2 of the second opening 43a2 may not agree with each other and may be misaligned.

In the plate-type refrigerant pipe 20 of one or more embodiments, the plurality of pipe portions 20A to 20D is formed, but only one pipe portion may be provided. In the plate-type refrigerant pipe 20, out of the pipe portions of the first pattern, second pattern, and third pattern, the pipe portion of only one or two patterns may be provided. The plate-type refrigerant pipe 20 may be provided with the pipe portion other than the first to third patterns.

[Operation and Effect of Embodiments]

Like the plate-type refrigerant pipe described in Patent Literature 1, when a plurality of refrigerant flow paths that cross each other is formed in the plate-type refrigerant pipe in order to cause the plurality of other refrigerant pipes to communicate with each other, the overall length of the refrigerant flow path becomes longer. As the length of the refrigerant flow path increases, the load received from the refrigerant of the plate-type refrigerant pipe increases. Therefore, the load on the joining surface of the two plates may increase, and the durability of the plate-type refrigerant pipe may decrease. Therefore, one or more embodiments of the present disclosure shorten the refrigerant flow path for causing at least three other refrigerant pipes connected to the plate-type refrigerant pipe to communicate with each other, and to reduce the load on the joining surface of two plates.

(1) The plate-type refrigerant pipe 20 of one or more embodiments includes the first plate 21 and the second plate 22 that is joined to the first plate 21 and forms the refrigerant flow path F together with the first plate 21. As shown in FIG. 8, the first plate 21 includes the first connection portion 25A to which the first refrigerant pipe 100A is connected to cause the refrigerant flow path F and the first refrigerant pipe 100A to communicate with each other. The second plate 22 includes the second connection portion 25B to which the second refrigerant pipe 100B is connected to cause the refrigerant flow path F and the second refrigerant pipe 100B to communicate with each other. The first plate 21 includes the third connection portion 25C to which the third refrigerant pipe 100C is connected to cause the refrigerant flow path F and the third refrigerant pipe 100C to communicate with each other. The first connection portion 25A and the second connection portion 25B overlap each other in the first direction perpendicular to the joining surface M of the first plate 21 and the second plate 22.

With the above-described configuration, the first to third refrigerant pipes 100A to 100C can communicate with each other by one refrigerant flow path F disposed therebetween, the refrigerant flow path F can be shortened, and the load on the joining surface M of the first and second plates 21 and 22 by the refrigerant flowing through the refrigerant flow path F can be reduced.

(2) In the plate-type refrigerant pipe 20 of one or more embodiments, the first connection portion 25A includes the first opening 43a1 to which the first refrigerant pipe 100A is connected, and the second connection portion 25B includes the second opening 43a2 to which the second refrigerant pipe 100B is connected. The first opening 43a1 and the second opening 43a2 overlap each other in the first direction. This can facilitate the flow of refrigerant between the first refrigerant pipe 100A and the second refrigerant pipe 100B.

(3) In the plate-type refrigerant pipe 20 of one or more embodiments, the first opening 43a1 and the second opening 43a2 are different in diameter. Therefore, the first refrigerant pipe 100A and the second refrigerant pipe 100B having different diameters can communicate with each other by the refrigerant flow path F.

(4) In the plate-type refrigerant pipe 20 of one or more embodiments, the first connection portion 25A includes the first cylindrical portion 43 disposed along the first direction, and the inner peripheral wall of the first cylindrical portion 43 defines the first opening 43a1. The second connection portion 25B includes the second cylindrical portion 43 disposed along the first direction, and the inner peripheral wall of the second cylindrical portion 43 defines the second opening 43a2. Therefore, the joining length between the first refrigerant pipe 100A and the first connection portion 25A (cylindrical portion 43), and the joining length between the second refrigerant pipe 100B and the second connection portion 25B (cylindrical portion 43) can be lengthened, and both can be firmly connected.

(5) In the plate-type refrigerant pipe 20 of one or more embodiments, the shape of the outer peripheral edge 25a of the first connection portion 25A viewed from the first direction, and the shape of the outer peripheral edge 25a of the second connection portion 25B viewed from the first direction are identical to each other. Therefore, when the pressure of the refrigerant is applied to the first connection portion 25A and the second connection portion 25B, it is possible to inhibit the force in the direction of peeling off the first plate 21 and the second plate 22 from acting on the plate-type refrigerant pipe 20.

(6) In the plate-type refrigerant pipe 20 of one or more embodiments, the first plate 21 and the second plate 22 includes the pipe body 24 disposed between the first connection portion 25A and the second connection portion 25B, and the third connection portion 25C to form the refrigerant flow path F. The pipe body 24 extends straight when viewed from the first direction. Therefore, the refrigerant flow path F can be formed at the shortest length between the first refrigerant pipe 100A and the second refrigerant pipe 100B, and the third refrigerant pipe 100C.

(7) In the plate-type refrigerant pipe 20 of one or more embodiments, the cross-sectional area of the refrigerant flow path F in the pipe body 24 is identical to or larger than the largest cross-sectional area of the refrigerant flow paths of the first refrigerant pipe 100A, the second refrigerant pipe 100B, and the third refrigerant pipe 100C. Such a configuration can reduce the pressure loss of the refrigerant flowing through the refrigerant flow path F of the pipe body 24.

(8) In the plate-type refrigerant pipe 20 of one or more embodiments, the cross-sectional area of the refrigerant flow path F in the pipe body 24 is larger than the smallest cross-sectional area of the refrigerant flow paths of the first refrigerant pipe 100A, the second refrigerant pipe 100B, and the third refrigerant pipe 100C. Such a configuration can reduce the pressure loss of the refrigerant flowing through the refrigerant flow path F of the pipe body 24.

(9) In the plate-type refrigerant pipe 20 of one or more embodiments, as shown in FIG. 8, the height h3 in the first direction of at least one of the first protrusion 41, 42 of the first connection portion 25A in the connection portion with the pipe body 24, the second protrusion 41, 42 of the second connection portion 25B, and the third protrusion 41, 42 of the third connection portion 25C differs from the height h1 in the first direction in the longitudinal middle portion of the pipe body 24. The inclined portion 24a that inclines in the first direction toward the protrusion 41, 42 with different height is provided at the longitudinal end of the pipe body 24. This makes it possible to reduce the pressure loss of the refrigerant flowing between the pipe body 24 and the connection portion 25 having different height.

(10) In the plate-type refrigerant pipe 20 of one or more embodiments, as shown in FIG. 5, the first plate 21 includes the first recessed groove 34 that forms at least part of the refrigerant flow path F. The first recessed groove 34 in the cross section of the refrigerant flow path F has an arc shape. The center of the arc is located on the first plate 21 side of the joining surface M of the first plate 21 and the second plate 22. Therefore, when the pressure of the refrigerant flowing through the refrigerant flow path F is applied to the inner surface of the recessed groove, it is possible to inhibit the force in the direction of peeling off the first plate 21 and the second plate 22 from acting on the plate-type refrigerant pipe 20.

(11) In the plate-type refrigerant pipe 20 of one or more embodiments, as shown in FIG. 5, the first plate 21 includes the first curved portion 35 that is curved from the joining surface M toward both ends of the first recessed groove 34 in the cross section of the refrigerant flow path F and forms at least part of the refrigerant flow path F. The tangent line L at the end on the first recessed groove 34 side in the first curved portion 35 and the tangent line at the end of the first recessed groove 34 agree with each other. This allows smooth connection between the first recessed groove 34 and the first curved portion 35.

(12) In the plate-type refrigerant pipe 20 of one or more embodiments, as shown in FIG. 5, the first recessed groove 34 and the first curved portion 35 are directly connected to each other in the cross section of the refrigerant flow path F. Therefore, the cross-sectional shape of the first recessed groove 34 can be made closer to a semicircle.

(13) In the plate-type refrigerant pipe 20 of one or more embodiments, as shown in FIG. 5, the second plate 22 includes the second recessed groove 36 that forms at least part of the refrigerant flow path F, and the second recessed groove 36 and the first recessed groove 34 form one refrigerant flow path F (F). The second recessed groove 36 has the same shape as the first recessed groove 34 in the cross section of the refrigerant flow path F. Therefore, even if the pressure of the refrigerant flowing through the refrigerant flow path F exerts force that brings the cross-sectional shape of the refrigerant flow path F closer to a perfect circle, it is possible to inhibit the force in the direction of peeling off the first plate 21 and the second plate 22 from acting on the plate-type refrigerant pipe 20.

(14) In the plate-type refrigerant pipe 20 of one or more embodiments, as shown in FIG. 8, the first plate 21 includes the closed portion 26 disposed at the end of the first recessed groove 34 in the refrigerant flow direction. The height h2 of the closed portion 26 from the joining surface M in the direction perpendicular to the joining surface M is identical to the height h1 of the first recessed groove 34 from the joining surface M in the direction perpendicular to the joining surface M. Similarly, as shown in FIG. 9, the second plate 22 includes the closed portion 26 disposed at the end of the second recessed groove 36 in the refrigerant flow direction and closing the refrigerant flow path F on the second plate 22 side of the joining surface M. The height h2 of the closed portion 26 from the joining surface M is identical to the height h1 of the second recessed groove 36 from the joining surface M. It is possible to reduce the shape change in the height direction between the first and second recessed grooves 34 and 36 and the closed portion 26, and to reduce the pressure loss of the refrigerant flowing inside.

(15) In the plate-type refrigerant pipe 20 of one or more embodiments, as shown in FIG. 8, the first plate 21 includes the connection portion 25 disposed at the end of the first recessed groove 34 in the refrigerant flow direction and to which the other refrigerant pipe 100 is connected. The second plate 22 also includes the connection portion 25 disposed at the end of the second recessed groove 36 in the refrigerant flow direction and to which the other refrigerant pipe 100 is connected. As shown in FIG. 5, the flow path width a3 in the direction along the joining surface M in the cross section of the first recessed groove 34 and the second recessed groove 36 is smaller than the flow path width b1 in the direction along the joining surface M in the cross section of the first connection portion 25A and the second connection portion 25B. Therefore, the first and second connection portions 25A and 25B increase the flow path width in the cross section to make it easier to connect the other refrigerant pipe 100, and the first and second recessed grooves 34 and 36 can make the flow path width a3 in the cross section smaller than that of the connection portion 25 to reduce the area that receives pressure from the refrigerant.

(16) In the plate-type refrigerant pipe 20 of one or more embodiments, as shown in FIG. 2 and FIG. 3, the shape of the outer peripheral edge 25a of the connection portion 25 viewed from the first direction, and the shape of the outer peripheral edge 26a of the closed portion 26 viewed from the first direction are identical to each other. Therefore, when the pressure of the refrigerant is applied to the inner surfaces of the connection portion 25 and the closed portion 26 disposed opposite to each other, it is possible to make it difficult for the force in the direction of peeling off the first and second plates 21 and 22 to act on the plate-type refrigerant pipe 20.

(17) The plate-type refrigerant pipe 20 of one or more embodiments includes, as shown in FIG. 6 and FIG. 7, the coupling pipe 50 attached to the first plate 21 and/or second plate 22 made of stainless steel and to which the other refrigerant pipe 100 is connected. The coupling pipe 50 includes a material other than stainless steel and identical to the material of the connected surface (outer peripheral surface) of the other refrigerant pipe 100. This allows the coupling pipe 50 to be easily connected to the other refrigerant pipe 100 by brazing.

(18) In the plate-type refrigerant pipe 20 of one or more embodiments, as shown in FIG. 6 and FIG. 7, the connected surface (outer peripheral surface) of the other refrigerant pipe 100 and the coupling pipe 50 are made of copper or copper alloy. This facilitates brazing of the other refrigerant pipe 100 and the coupling pipe 50 by using an inexpensive brazing material.

(19) In the plate-type refrigerant pipe 20 of one or more embodiments, as shown in FIG. 6 and FIG. 7, the first plate 21 and/or second plate 22 includes the cylindrical portion 43 formed in a cylindrical shape, and the coupling pipe 50 is joined to the inner peripheral surface or outer peripheral surface of the cylindrical portion 43. This ensures the joining length between the first plate 21 and/or second plate 22 and the coupling pipe 50, allowing both portions to be firmly connected.

(20) In the plate-type refrigerant pipe 20 of one or more embodiments, as shown in FIG. 6 and FIG. 7, the inner peripheral surface of the cylindrical portion 43 of the connection portion 25 and the outer peripheral surface of the coupling pipe 50 are joined to each other, and in the pipe axis direction of the coupling pipe 50, the coupling pipe 50 is formed longer than the cylindrical portion 43 and protrudes from the cylindrical portion 43 toward the joining surface M. As described with reference to FIG. 10, this facilitates brazing of the cylindrical portion 43 and the coupling pipe 50.

(21) In the plate-type refrigerant pipe 20 of one or more embodiments, as shown in FIG. 6 and FIG. 7, in the pipe axis direction of the coupling pipe 50, the coupling pipe 50 is formed longer than the cylindrical portion 43 and protrudes outward from the distal end 43d of the cylindrical portion 43. This facilitates, as described with reference to FIG. 10, brazing of the cylindrical portion 43 and the coupling pipe 50, and brazing of the coupling pipe 50 and the other refrigerant pipe 100.

(22) In the plate-type refrigerant pipe 20 of one or more embodiments, the first projection (first positioning mechanism) 51 that is in contact with the axial end of the cylindrical portion 43 and sets the pipe axial position of the coupling pipe 50 with respect to the cylindrical portion 43 is formed on the outer peripheral surface or inner peripheral surface of the coupling pipe 50. This allows accurate positioning of the coupling pipe 50 with respect to the cylindrical portion 43.

(23) In the plate-type refrigerant pipe 20 of one or more embodiments, the second projection (second positioning mechanism) 52 that sets the position in the pipe axial direction of the other refrigerant pipe 100 with respect to the coupling pipe 50 by bringing the pipe axial end of the other refrigerant pipe 100 in contact is formed on the inner peripheral surface or outer peripheral surface of the coupling pipe 50. This allows accurate positioning of the other refrigerant pipe 100 with respect to the coupling pipe 50.

(24) In the plate-type refrigerant pipe 20 of one or more embodiments, the first plate 21 and/or second plate 22 and the coupling pipe 50 are connected by in-furnace brazing. This facilitates brazing between the first plate 21 and/or second plate 22 made of stainless steel and the coupling pipe 50 made of a material other than stainless steel.

(25) In the refrigeration apparatus 1 of one or more embodiments, as shown in FIG. 6 and FIG. 7, the other refrigerant pipe 100 overlaps the cylindrical portion 43 in the pipe diameter direction. Therefore, the cylindrical portion 43 and the refrigerant pipe 100 can compensate for the decrease in strength of the coupling pipe 50 caused by in-furnace brazing.

Although the disclosure has been described with respect to only a limited number of embodiments, those skilled in the art, having benefit of this disclosure, will appreciate that various other embodiments may be devised without departing from the scope of the present disclosure. Accordingly, the scope of the disclosure should be limited only by the attached claims.

REFERENCE SIGNS LIST 21 first plate
22 second plate
24 pipe body
25A first connection portion
25B second connection portion
25C third connection portion
25a outer peripheral edge
34 first recessed groove
36 second recessed groove
43 cylindrical portion (first cylindrical portion, second cylindrical portion)
43a1 first opening
43a2 second opening
100A first refrigerant pipe
100B second refrigerant pipe
100C third refrigerant pipe
F refrigerant flow path
M joining surface

What is claimed is:

1. A refrigerant pipe comprising:
a first plate; and
a second plate, wherein
the first plate and the second plate are joined to form a refrigerant flow path,
the first plate comprises a first connection portion to which a first external refrigerant pipe is connected and that causes the refrigerant flow path to communicate with the first external refrigerant pipe,
the second plate comprises a second connection portion to which a second external refrigerant pipe is connected and that causes the refrigerant flow path to communicate with the second external refrigerant pipe,
one or both of the first plate and the second plate comprise a third connection portion to which a third external refrigerant pipe is connected and that causes the refrigerant flow path to communicate with the third external refrigerant pipe,
the first connection portion overlaps the second connection portion in a first direction perpendicular to a joining surface where the first plate and the second plate are joined,
the refrigerant flow path comprises a pipe body disposed between the first connection portion and the third connection portion,
the first connection portion comprises a first protrusion protruding toward the first plate with respect to the joining surface,
the second connection portion comprises a second protrusion protruding toward the second plate with respect to the joining surface,
the third connection portion comprises a third protrusion protruding toward the one or both of the first plate and the second plate with respect to the joining surface,
a height of one of the first protrusion, the second protrusion, and the third protrusion from the joining surface in the first direction differs from a height of the pipe body from the joining surface in the first direction in an intermediate portion in a longitudinal direction of the pipe body, and
the pipe body comprises an inclined portion at an end of the pipe body in the longitudinal direction, wherein the inclined portion is inclined in the first direction toward the one of the first protrusion, the second protrusion, and the third protrusion.

2. The refrigerant pipe according to claim 1, wherein
the first connection portion and the second connection portion are disposed at a first end of the refrigerant flow path, and
the third connection portion is disposed at a second end of the refrigerant flow path.

3. The refrigerant pipe according to claim 1, wherein
the first connection portion has a first opening to which the first external refrigerant pipe is connected,
the second connection portion has a second opening to which the second external refrigerant pipe is connected, and
the first opening overlaps the second opening in the first direction.

4. The refrigerant pipe according to claim 3, wherein
the first connection portion comprises a first cylindrical portion that extends along the first direction,
the second connection portion comprises a second cylindrical portion that extends along the first direction,
an inner peripheral wall of the first cylindrical portion defines the first opening, and
an inner peripheral wall of the second cylindrical portion defines the second opening.

5. The refrigerant pipe according to claim 1, wherein
the first connection portion has a first opening to which the first external refrigerant pipe is connected,
the second connection portion has a second opening to which the second external refrigerant pipe is connected,
the first opening overlaps the second opening in the first direction, and the first opening has a diameter that is different from a diameter of the second opening.

6. The refrigerant pipe according to claim 1, wherein a shape of an outer peripheral edge of the first connection portion viewed from the first direction is identical to a shape of an outer peripheral edge of the second connection portion viewed from the first direction.

7. The refrigerant pipe according to claim 1, wherein
the refrigerant flow path comprises a pipe body disposed between the first connection portion and the third connection portion, and
the pipe body extends straight when viewed from the first direction.

8. The refrigerant pipe according to claim 1, wherein
the refrigerant flow path comprises a pipe body disposed between the first connection portion and the third connection portion, and
a cross-sectional area of the refrigerant flow path in the pipe body is equal to or larger than a maximum cross-sectional area of cross-sectional areas of refrigerant flow paths of the first external refrigerant pipe, the second external refrigerant pipe, and the third external refrigerant pipe.

9. The refrigerant pipe according to claim 1, wherein
the refrigerant flow path comprises a pipe body disposed between the first connection portion and the third connection portion,
the pipe body comprises a recessed groove in one of the first plate and the second plate,
the recessed groove has an arc shape in a cross section of the refrigerant flow path, and
a center of the arc shape of the recessed groove is on a side of the recessed groove with respect to the joining surface.

10. A refrigeration apparatus comprising the refrigerant pipe according to claim 1.

11. A refrigerant pipe comprising:
a first plate; and
a second plate, wherein
the first plate and the second plate are joined to form a refrigerant flow path,
the first plate comprises a first connection portion to which a first external refrigerant pipe is connected and that causes the refrigerant flow path to communicate with the first external refrigerant pipe,
the second plate comprises a second connection portion to which a second external refrigerant pipe is connected and that causes the refrigerant flow path to communicate with the second external refrigerant pipe,
one or both of the first plate and the second plate comprise a third connection portion to which a third external refrigerant pipe is connected and that causes the refrigerant flow path to communicate with the third external refrigerant pipe,
the first connection portion overlaps the second connection portion in a first direction perpendicular to a joining surface where the first plate and the second plate are joined,
the refrigerant flow path comprises a pipe body disposed between the first connection portion and the third connection portion, and
a cross-sectional area of the refrigerant flow path in the pipe body is larger than a minimum cross-sectional area of cross-sectional areas of refrigerant flow paths of the first external refrigerant pipe, the second external refrigerant pipe, and the third external refrigerant pipe.

* * * * *